United States Patent
Zhang et al.

(10) Patent No.: US 9,401,742 B2
(45) Date of Patent: Jul. 26, 2016

(54) ON CELL/FINGER ASSIGNMENT FOR REDUCED CELL DELAY SPREAD

(71) Applicant: QUALCOMM Incorporated, San Diego, CA (US)

(72) Inventors: Wei Zhang, Santa Clara, CA (US); Guang Xie, San Jose, CA (US); Hemanth Kumar Rayapati, San Diego, CA (US); Feng Lu, Sunnyvale, CA (US); Nate Chizgi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/675,493

(22) Filed: Mar. 31, 2015

(65) Prior Publication Data
US 2016/0119023 A1    Apr. 28, 2016

Related U.S. Application Data

(60) Provisional application No. 62/067,375, filed on Oct. 22, 2014.

(51) Int. Cl.
*H04B 1/7117* (2011.01)

(52) U.S. Cl.
CPC .... *H04B 1/7117* (2013.01); *H04B 2201/70702* (2013.01); *H04B 2201/709781* (2013.01)

(58) Field of Classification Search
CPC ............... H04B 1/7117; H04B 2201/70702; H04B 2201/709781
See application file for complete search history.

(56) References Cited

U.S. PATENT DOCUMENTS

| | | | |
|---|---|---|---|
| 6,785,321 B1 * | 8/2004 | Yang | H04B 1/7095 342/357.66 |
| 7,130,330 B2 | 10/2006 | Reznik et al. | |
| 7,340,017 B1 | 3/2008 | Banerjee | |
| 8,416,838 B2 | 4/2013 | Chen et al. | |
| 8,842,781 B2 | 9/2014 | Clevorn et al. | |
| 8,879,678 B1 | 11/2014 | Rajurkar et al. | |
| 2014/0161156 A1 | 6/2014 | Cui et al. | |

FOREIGN PATENT DOCUMENTS

| | | |
|---|---|---|
| GB | 2320654 | 6/1998 |
| WO | WO-03069793 A1 | 8/2003 |

OTHER PUBLICATIONS

International Search Report and Written Opinion—PCT/US2015/054328—ISA/EPO—Dec. 3, 2015.

* cited by examiner

*Primary Examiner* — Sophia Vlahos
(74) *Attorney, Agent, or Firm* — Loza & Loza LLP

(57) ABSTRACT

Methods and apparatus for wireless communications are described. A method of wireless communications includes determining an energy for a first signal received at a first finger of a rake receiver after a reference signal is received at a second finger of the rake receiver, determining an energy for a second signal received at a third finger of a rake receiver before the reference signal is received at the second finger of the rake receiver, and selecting the first signal as a new reference signal when the energy of the first signal exceeds the energy of the second signal by a predefined threshold amount. In another aspect, a method includes assigning a signal received at a rake receiver to a finger of the rake receiver, and deassigning the finger if the signal has an energy level below a preselected lock threshold energy for a predefined time.

30 Claims, 13 Drawing Sheets

ON CELL/FINGER ASSIGNMENT FOR REDUCED CELL DELAY SPREAD

CROSS-REFERENCE TO RELATED APPLICATIONS

The present application for patent claims priority to Provisional Application No. 62/067,375 entitled "Improvement On Cell/Finger Assignment For Reduced Cell Delay Spread" filed Oct. 22, 2014, which is assigned to the assignee hereof and hereby expressly incorporated by reference herein.

TECHNICAL FIELD

The technology discussed below relates generally to wireless communication systems, and more particularly, to improved handling of fingers with large delay spread.

BACKGROUND

Wireless communication networks are widely deployed to provide various communication services such as telephony, video, data, messaging, broadcasts, and so on. Such networks, which are usually multiple access (e.g., multipath) networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). In one example the IS-2000 1× network (1×RTT) belongs to the CDMA2000 standard supported by the 3rd Generation Partnership Project 2 (3GPP2) group. The UMTS also supports enhanced 3G data communications protocols, such as High Speed Packet Access (HSPA), which provides higher data transfer speeds and capacity to associated UMTS networks.

A rake receiver is a radio receiver designed to counter the effects of multipath fading. It does this using several "sub-receivers" called fingers; that is, several correlators each assigned to a different multipath component. The rake receiver is so named because it may be analogized using the function of a garden rake. That is, each finger of the rake receiver collects symbol energy, while the tines on a rake collect leaves. Rake receivers are common in a wide variety of CDMA and W-CDMA radio devices such as mobile phones and wireless LAN equipment. Each finger may independently decode a multipath component. Multipath components may be delayed copies of an original transmitted wave traveling through a different path (e.g., transmissions from a repeater may be delayed in comparison to transmissions from an originating base station or Node B), each with a different magnitude and time-of-arrival (also referred to as phase) at the receiver. Since each component contains the original information, if the magnitude and time-of-arrival/phase of each component is computed at the receiver through a process called channel estimation, then all the components can be added coherently to improve the information reliability.

Cell delay spread is a metric used in system design. The cell delay spread may refer to the time interval during which arriving multipath signals with significant energy arrive. The cell delay spread may be used to determine other system designs, such as transmit power control (TPC), turn-around time distribution between firmware and hardware, length of sample reading for each block processing group (BPG), and/or the like. However, with widely deployed repeaters, cell delay spreads greater than a predefined maximum value may be seen. Generally, signals received from a repeater may be stronger than those received directly from a base station or Node B, although the signal from the repeater may be delayed with respect to the signal received directly from the base station.

Therefore, improvements in handling fingers with large delay spreads may be desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure provide methods and apparatuses for improving triage processes used to assign and de-assign fingers of a rake receiver included in a wireless communications apparatus. The improved triage processes may lead to more efficient use of resources used to track out of range fingers, for example.

Various aspects of the disclosure relate to a method of wireless communications operable at user equipment (UE). The method may include determining an energy for a first signal that is received at a first finger of a rake receiver after a second signal is received at a second finger of the rake receiver, where a cell associated with the second signal is selected as a reference cell. The method may include determining an energy for a third signal received at a third finger of the rake receiver before the second signal is received at the second finger of the rake receiver, and selecting a cell associated with the first signal as the reference cell when the energy of the third signal exceeds the energy of the first signal by less than a predefined threshold amount.

According to certain aspects, the method may include assigning a fourth signal received at the rake receiver to a fourth finger of the rake receiver, resetting a first counter corresponding to the fourth finger to a reset value when the fourth signal is assigned to the fourth finger of the rake receiver, periodically determining whether the fourth signal has an energy level that exceeds a threshold energy level, incrementing the first counter in each period where the energy level is determined to exceed the threshold energy level, and de-assigning the fourth signal from the fourth finger of the rake receiver when the first counter remains at the reset value after a predetermined number of periods.

According to certain aspects, an apparatus adapted for wireless communication may be configured to perform certain methods disclosed herein. The apparatus may include one or more radio frequency front ends configured to receive a plurality of radio frequency (RF) signals, the plurality of RF signals including multiple versions of a signal of interest, a searcher configured to determine an energy level for each of the plurality of signals, a rake receiver that has a plurality of fingers, and a processor. The processor may be configured to determine an energy for a first signal that is received at a first finger of the rake receiver after a second signal is received at a second finger of the rake receiver, where a cell associated with the second signal is selected as a reference cell. The processor may be configured to determine an energy for a third signal received at a third finger of the rake receiver before the second signal is received at the second finger of the rake receiver, and select a cell associated with the first signal as the reference cell when the energy of the third signal exceeds the energy of the first signal by less than a predefined threshold amount.

According to certain aspects, an apparatus for wireless includes means for determining the energies of signals received at one or more radio frequency front ends. The means for determining energy of signals may be configured to determine an energy of a first signal that is received at a first finger of a rake receiver after a second signal is received at a second finger of the rake receiver, where a cell associated with the second signal is selected as a reference cell. The apparatus may include means for selecting and deselecting a reference cell. The means for selecting and reselecting the reference cell may be configured to select a cell associated with the first signal as the reference cell when the energy of a third signal exceeds the energy of the first signal by less than a predefined threshold amount, and when the third signal is received at a third finger of the rake receiver before the second signal is received at the second finger of the rake receiver.

According to certain aspects, a computer-readable storage medium has instructions encoded thereon. The storage medium may be a transitory or non-transitory storage medium. When executed by one or more processors in a processing circuit, the instructions may cause the one or more processors to determine an energy of a first signal that is received at a first finger of a rake receiver after a second signal is received at a second finger of the rake receiver, where a cell associated with the second signal is selected as a reference cell. The instructions may cause the one or more processors to select a cell associated with the first signal as the reference cell when the energy of a third signal exceeds the energy of the first signal by less than a predefined threshold amount, and when the third signal is received at a third finger of the rake receiver before the second signal is received at the second finger of the rake receiver.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
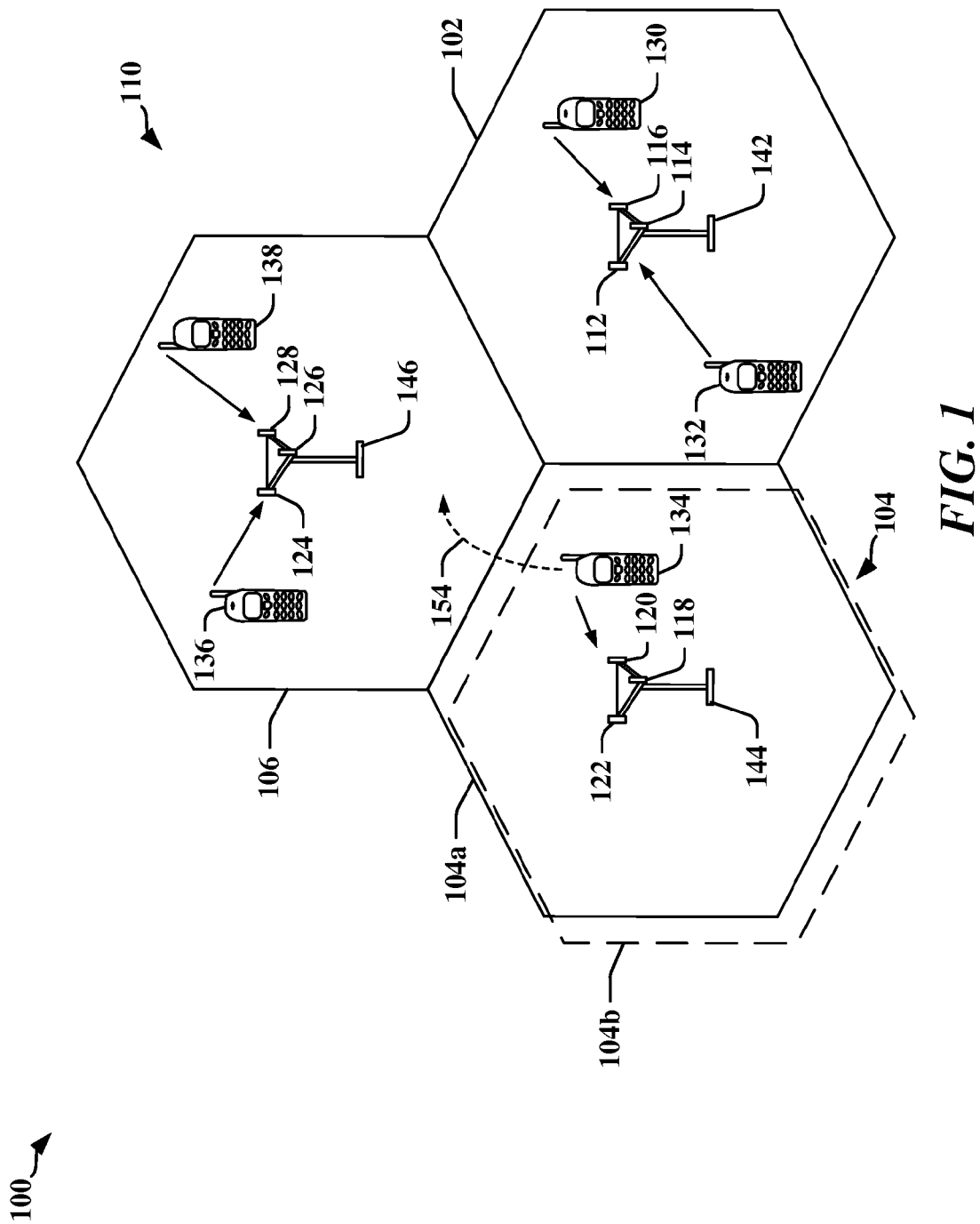
FIG. 1 is a conceptual diagram illustrating a wireless communications system in which one or more aspects of the present disclosure may find application.

Referring to FIG. 1, by way of example and without limitation, a simplified schematic illustration of a networking environment 100 that includes RAN 110 that may be implemented as a UTRAN, E-UTRAN, or other such architecture. The RAN 110 may include multiple cellular regions (cells), including cells 102, 104, and 106, each of which may include one or more sectors. Cells may be defined geographically (e.g., by coverage area) and/or may be defined in accordance with a frequency, scrambling code, etc. That is, the illustrated geographically-defined cells 102, 104, and 106 may each be further divided into a plurality of cells, e.g., by utilizing different scrambling codes. For example, cell 104a may utilize a first scrambling code, and cell 104b, while in the same geographic region and served by the same base station 144, may be distinguished by utilizing a second scrambling code. In one example, the base stations 142, 144 and 146 may operate as the Node B 208 of FIG. 2.

In a cell that is divided into sectors, the multiple sectors within a cell can be formed by groups of antennas with each antenna responsible for communication with UEs in a portion of the cell. For example, in cell 102, antenna groups 112, 114, and 116 may each correspond to a different sector. In cell 104, antenna groups 118, 120, and 122 may each correspond to a different sector. In cell 106, antenna groups 124, 126, and 128 may each correspond to a different sector.

The cells 102, 104, and 106 may include, within their respective coverage areas, several UEs that may be in communication with one or more sectors of each cell 102, 104, or 106. For example, UEs 130 and 132 may be in communication with the base station 142, UE 134 may be in communication with base station 144, and UEs 136 and 138 may be in communication with base station 146. Here, each base station 142, 144, and 146 may be configured to provide an access point to a core network 204 (see FIG. 2) for all the UEs 130, 132, 134, 136, and 138 in the respective cells 102, 104, and 106.

Figure 2:
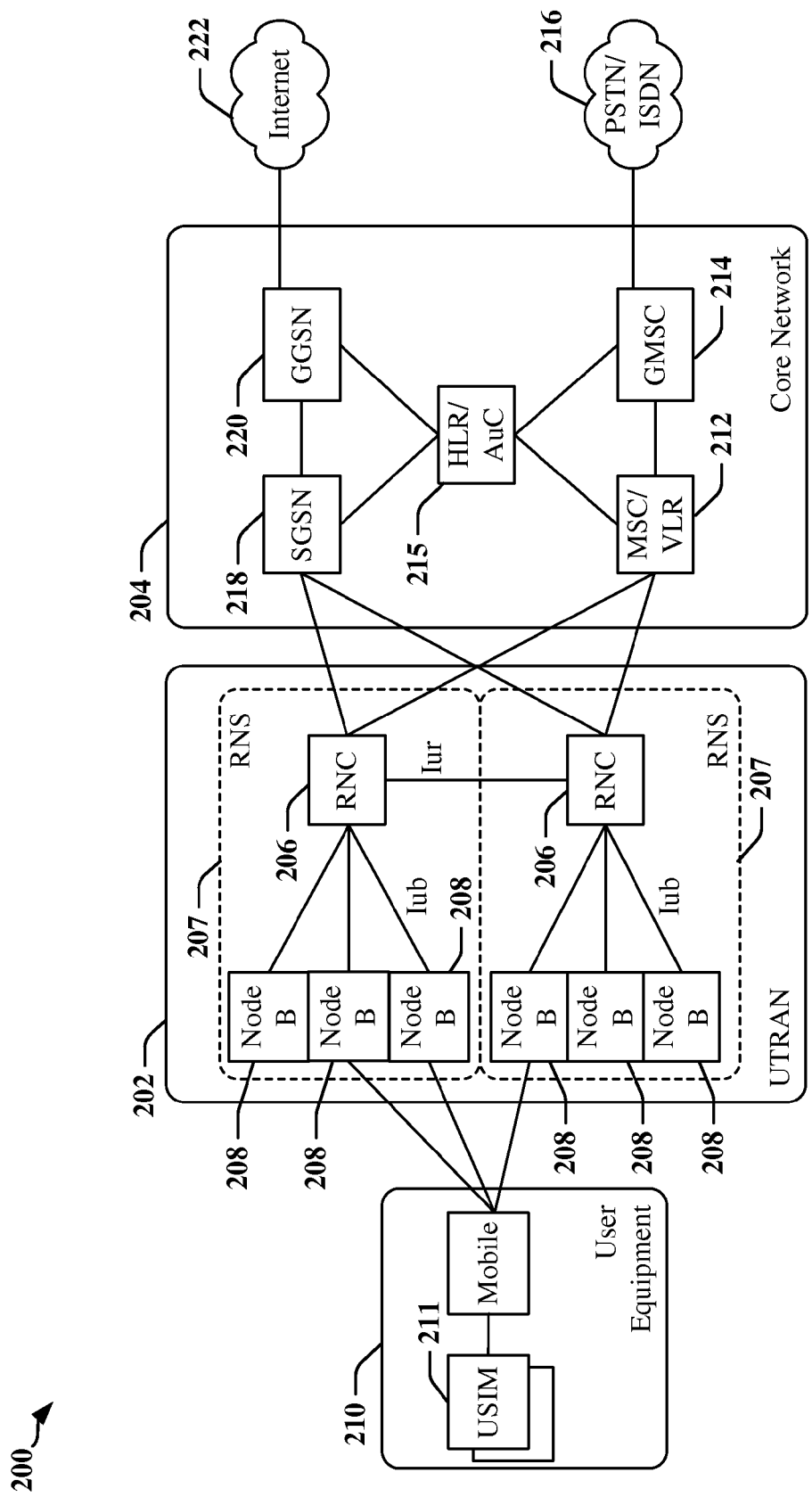
FIG. 2 is a conceptual diagram illustrating an example of a telecommunications system.

FIG. 2 illustrates one example of a wireless networking environment, among the various possible examples. In the example depicted, various aspects of the present disclosure are illustrated with reference to a Universal Mobile Telecommunications System (UMTS) 200. A UMTS 200 includes three interacting domains: a core network 204, a RAN (e.g., the UTRAN) 202, and a UE 210. Among several options available for the illustrated example, the UTRAN 202 may employ a W-CDMA air interface for enabling various wireless services including telephony, video, data, messaging, broadcasts, and/or other services. The UTRAN 202 may include a plurality of Radio Network Subsystems (RNSs) 207, each controlled by a respective Radio Network Controller (RNC) 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each depicted RNS 207; however, the RNSs 207 may include any number of wireless Node Bs 208. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similarly functioning device.

Mobile apparatus is commonly referred to as user equipment or UE 210 in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS, the UE 210 may further include a universal subscriber identity module (USIM) 211, which contains a user's subscription information to a network. The UE 210 may include a plurality of USIMs 211. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs 210 with access to types of core networks other than UMTS core networks 204.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, such as Equipment Identity Register (EIR), a VLR, a home location register (HLR), and/or an authentication center (AuC) may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs 206 may be connected to the MSC 212. The MSC 212 is an apparatus that controls call setup, call routing, and UE mobility functions. The MSC 212 also includes a VLR that contains subscriber-related information for the duration that a UE 210 is in the coverage area of the MSC 212. The GMSC 214 provides a gateway through the MSC 212 for the UE 210 to access a circuit-switched network 216. The GMSC 214 includes an HLR 215 containing subscriber data, such as the data reflecting the details of the services to which a particular user has subscribed. The HLR 215 is also associated with an AuC that contains subscriber-specific authentication data. When a call is received for a particular UE 210, the GMSC 214 queries the HLR 215 to determine the location of the UE 210 and forwards the call to the particular MSC 212 serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface. The UTRAN 202 is but one example of a RAN that may be utilized in accordance with the present disclosure.

Figure 3:
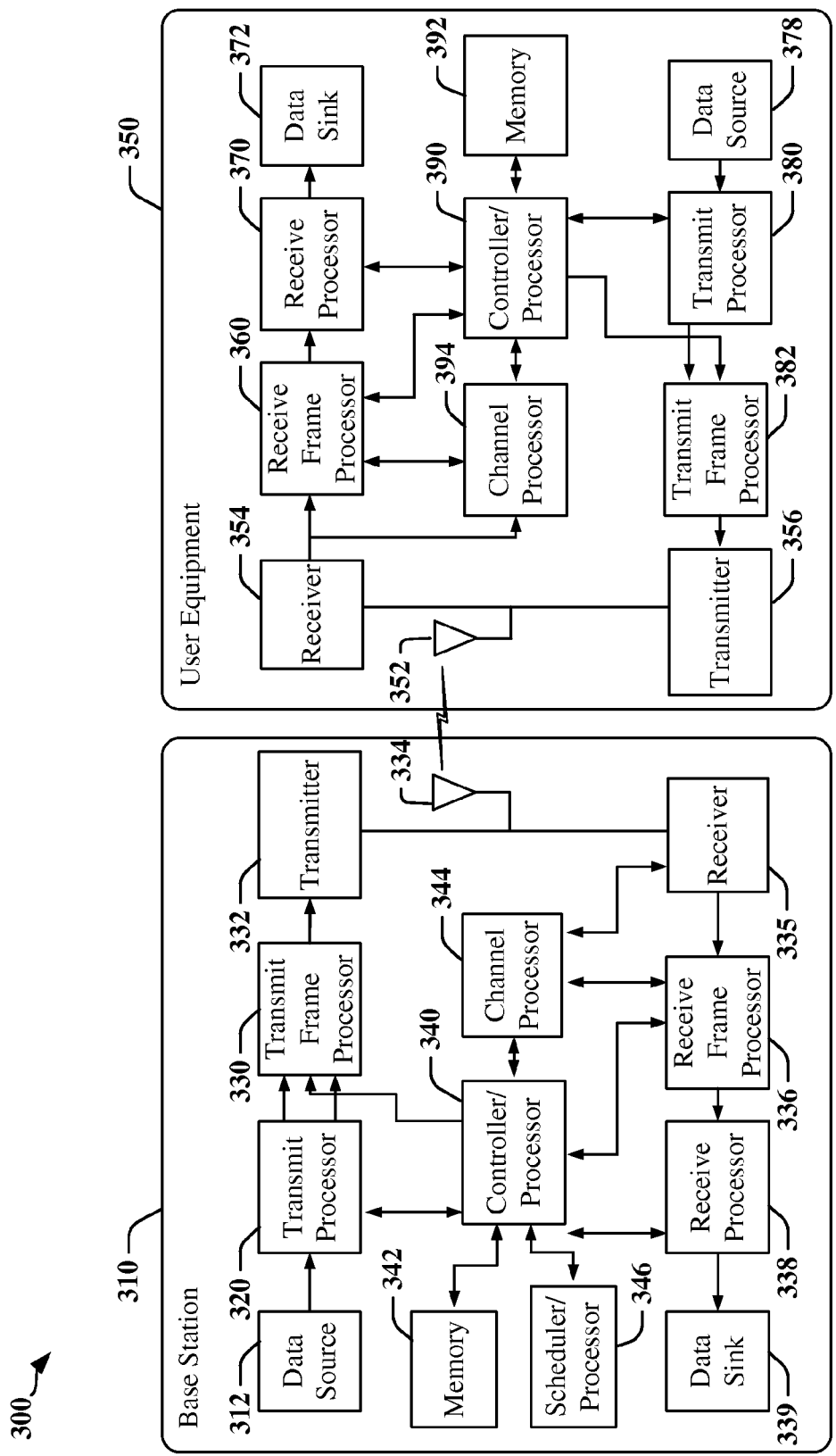
FIG. 3 illustrates an example of a base station in communication with user equipment in a networking system.

FIG. 3 is a block diagram illustrating an example of a base station 310 in communication with a UE 350, where the base station 310 may be one of the Node Bs 208 in FIG. 2, and the UE 350 may be the UE 210 in FIG. 2. Each of the base station 310 and the UE 350 may include one or more processing circuits such as the processing circuit 902 of FIG. 9. For downlink communications, a transmit processor 320 of the base station 310 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by the controller/processor 340 to determine the coding, modulation, spreading, and/or scrambling schemes for the transmit processor 320. These channel estimates may be derived from a reference signal transmitted by the UE 350 or from feedback from the UE 350. The symbols generated by the transmit processor 320 are provided to a transmit frame processor 330 to create a frame structure. The transmit frame processor 330 creates this frame structure by multiplexing the symbols with information from the controller/processor 340, resulting in a series of frames. The frames are then provided to a transmitter 332, which provides various signal conditioning functions including amplifying, filtering, and modulating the frames onto a carrier for downlink transmission over the wireless medium through antenna 334. The antenna 334 may include one or more antennas, for example, including beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides information from the frames to a channel processor 394 and the data, control, and reference signals to a receive processor 370. The receive processor 370 then performs the inverse of the processing performed by the transmit processor 320 in the base station 310. More specifically, the receive processor 370 descrambles and despreads the symbols, and then determines the most likely signal constellation points transmitted by the base station 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., a display). Control signals carried by successfully decoded frames are provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 in the UE 350 are provided to a transmit processor 380. Control signals from the controller/processor 390 may be provided to the transmit processor 380. The data source 378 may represent applications running in the UE 350 and various user interfaces (e.g., keyboard). Similar to the functionality described in connection with the downlink transmission by the base station 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the base station 310 or from feedback contained in a midamble transmitted by the base station 310, may be used to select the appropriate coding, modulation, spreading, and/or scrambling schemes. The symbols produced by the transmit processor 380 may be provided to a transmit frame processor 382 to create a frame structure. The transmit frame processor 382 creates this frame structure by multiplexing the symbols with information from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the base station 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides information from the frames to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor 338, the controller/processor 340 may use an acknowledgement (ACK) and/or negative acknowledgement (NACK) protocol to support retransmission requests for those frames.

The controller/processors 340 and 390 may be used to direct the operation at the base station 310 and the UE 350, respectively. For example, the controller/processors 340 and 390 may provide various functions including timing, peripheral interfaces, voltage regulation, power management, and other control functions. The processor readable media of memories 342 and 392 may store data and software for the base station 310 and the UE 350, respectively. A scheduler/processor 346 at the base station 310 may be used to allocate resources to UEs and schedule downlink and uplink transmissions for the UEs.

In a wireless telecommunication system, the communication protocol architecture may take on various forms depending on the particular application. For example, in a 3GPP UMTS, the signaling protocol stack is divided into a Non-Access Stratum (NAS) and an Access Stratum (AS). The NAS provides the upper layers for signaling between the UE 210 and the core network 204 (referring to FIG. 2), and may include circuit switched and packet switched protocols. The AS provides the lower layers for signaling between the UTRAN 202 and the UE 210, and may include a user plane and a control plane. Here, the user plane or data plane carries user traffic, while the control plane carries control information (i.e., signaling).

Figure 4:
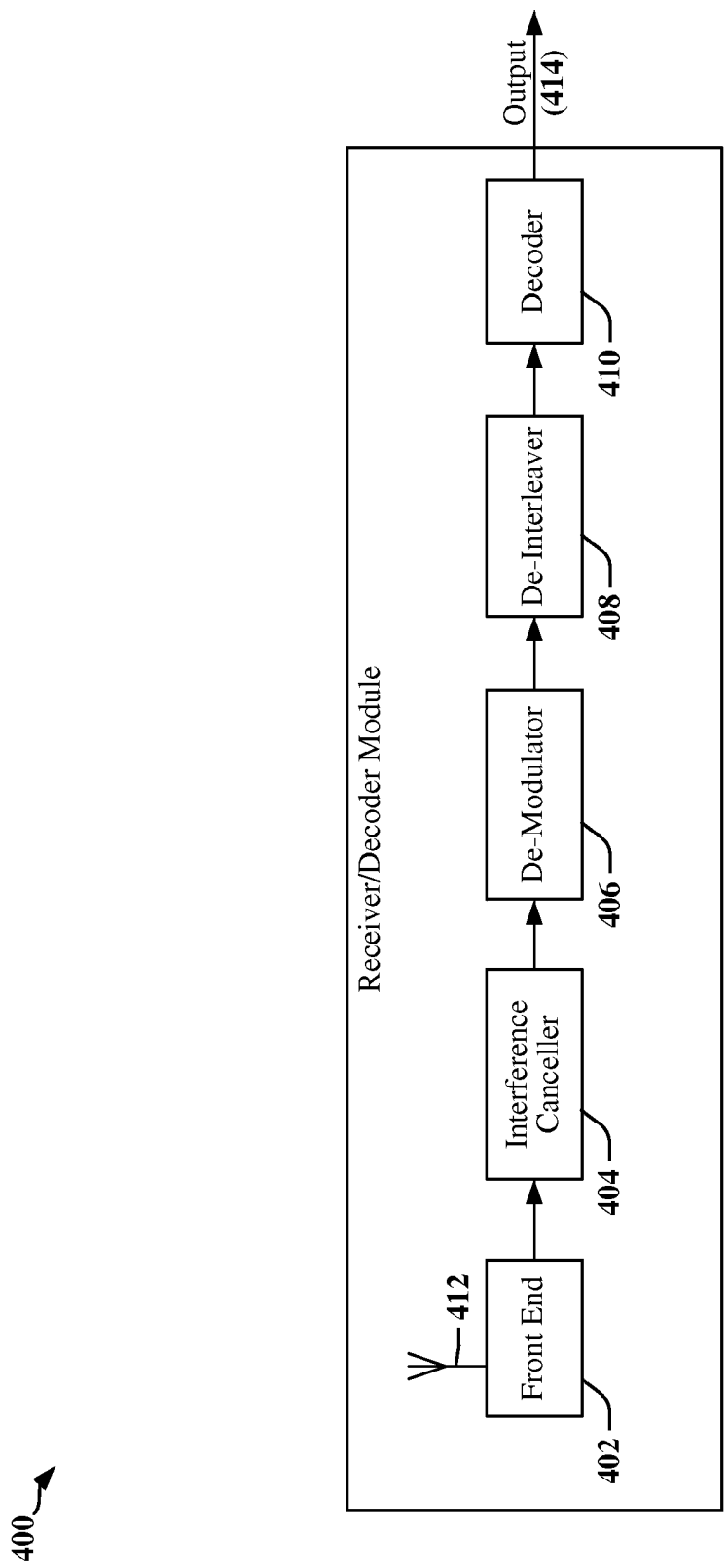
FIG. 4 is a block diagram illustrating certain components of a receiver module which may be adapted according to certain aspects of the present disclosure.

FIG. 4 is a simplified block diagram depicting certain functional components of a receiver/decoder module 400, according to at least one example. The receiver/decoder module 400 may include an RF front end 402, an interference canceller 404, a de-modulator 406, a de-interleaver 408 and a decoder 410. The receiver/decoder module 400 may be configured to process received signals in accordance with various embodiments. Radio frequency signals may be received via an antenna 412 and the RF front end 402. The RF front end 402 may include amplifiers, filters and/or other RF circuits. The RF front end 402 may be configured to convert RF signals received by the antenna 412 to a baseband frequency or to another frequency suitable for demodulation.

The interference canceller 404 may include circuits and/or modules adapted to perform iterative interference cancellation on signals provided by the RF front end 402 to cancel interference. The de-modulator 406 may include circuits and/or modules adapted to de-modulate the signals output by the interference canceller 404 in order to recover information modulated onto a carrier frequency. Information modulated onto the carrier frequency may include a bitstream transmitted in a succession of symbols. The de-modulator 406 may parse received frames, descramble and despread the symbols, and determine the most likely signal constellation points corresponding to the symbols, based on the modulation scheme. The de-interleaver 408 may include circuits and/or modules adapted to re-order bits in a decoded bit stream into their original order. The bit stream processed by the de-modulator 406 and re-ordered by the de-interleaver 408 can be provided to the decoder 410. The decoder 410 may include circuits and/or modules adapted to obtain output information 414 decoded from the input RF signals. The de-modulator 406, the de-interleaver 408 and the decoder 410 may employ conventional circuits and/or modules that are generally known in the art.

Figure 5:
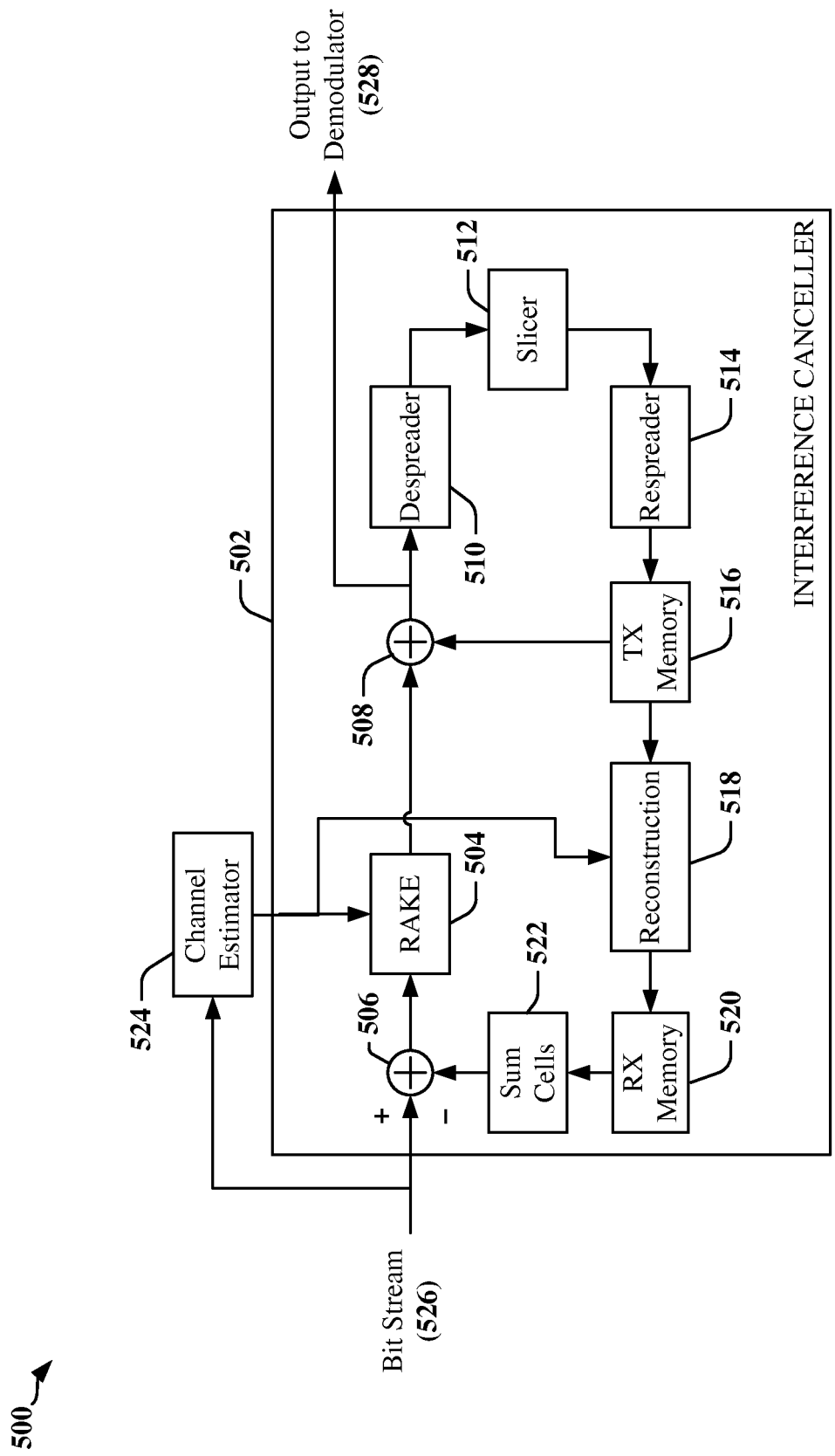
FIG. 5 is a block diagram illustrating certain components of an interference canceller according to at least one example.

FIG. 5 is a block diagram 500 illustrating an example of an interference canceller 502 that includes a rake receiver 504. According to at least one aspect of the present disclosure, the interference canceller 502 may be adapted to iteratively cancel interference associated with a received bit stream 526. The interference canceller 502 includes a first combiner (or adder) 506, the rake receiver 504, a second combiner (or adder) 508, a despreader 510, a slicer 512, a respreader 514, a transmit (TX) memory 516, a reconstruction component 518, a receive (RX) memory 520 and a cell summation component 522.

When a wireless communications device (see the UE 210 of FIG. 2, for example) receives a wireless signal at its communications interface (e.g., front end 402 of FIG. 4), a bit stream 526 received in the wireless signal may be conveyed to the interference canceller 502. Initially, the received bit stream 526 may be conveyed to the channel estimator 524, which may be adapted to provide initial estimated information used for processing the received signal. The channel estimator 524 may include any conventional circuits and/or modules adapted to provide initial channel estimates for signal processing. The channel estimator 524 may be implemented as a rake channel estimator, a maximum likelihood algorithm component, a moving average filter, a Kalman filter, etc. In at least one example, the channel estimator 524 determines a delay for each multipath signal, the frequency offset associated with each path and the channel gain associated with each path.

The channel estimates obtained from the channel estimator 524 may be employed by the rake receiver 504. The rake receiver 504 may have a plurality of fingers adapted to process a respective multipath signal. Each finger may be adapted or configured to employ the delay determined by the channel estimator 524 for the corresponding multipath signal, and to align the different multipath components to a similar or common timing structure. Each finger may be further adapted or configured to offset the frequency variances according to the frequency offset determined by the channel estimator 524 for the corresponding multipath signal, and to employ the channel gain information obtained by the channel estimator 524 for the corresponding multipath signal. The contribution of all fingers can be combined to make the most use of the different transmission characteristics of each transmission path.

The signal provided by the rake receiver 504 may be conveyed to the second combiner 508, where the signal is combined with information stored in the TX memory 516. In the first iteration, the TX memory 516 may be empty such that the signal is not changed at the second combiner 508. On subsequent iterations, the information stored in the TX memory 516 may be added to the signal from the rake receiver 504 to boost the desired signal.

Each of the multiple signals can subsequently be individually despread in the despreader 510, sliced (or parsed) in the slicer 512, and respread at the respreader 514. The slicer 512 may be adapted to perform symbol decisions on each active code channel within each interfering signal. The slicer 512 may employ one or more different slicer algorithms. For instance, the slicer 512 may employ a hard slicer adapted to employ hard decisions to parsing each individual frame, a nonlinear slicer (e.g., nonlinear minimum mean square error (MMSE) slicer), and/or a linear slicer (e.g., a linear MMSE slicer). The linear and nonlinear slicers are adapted to generate an estimation for slicing, without loss of the original data. In this manner, the information can be improved in each iteration.

Figure 6:
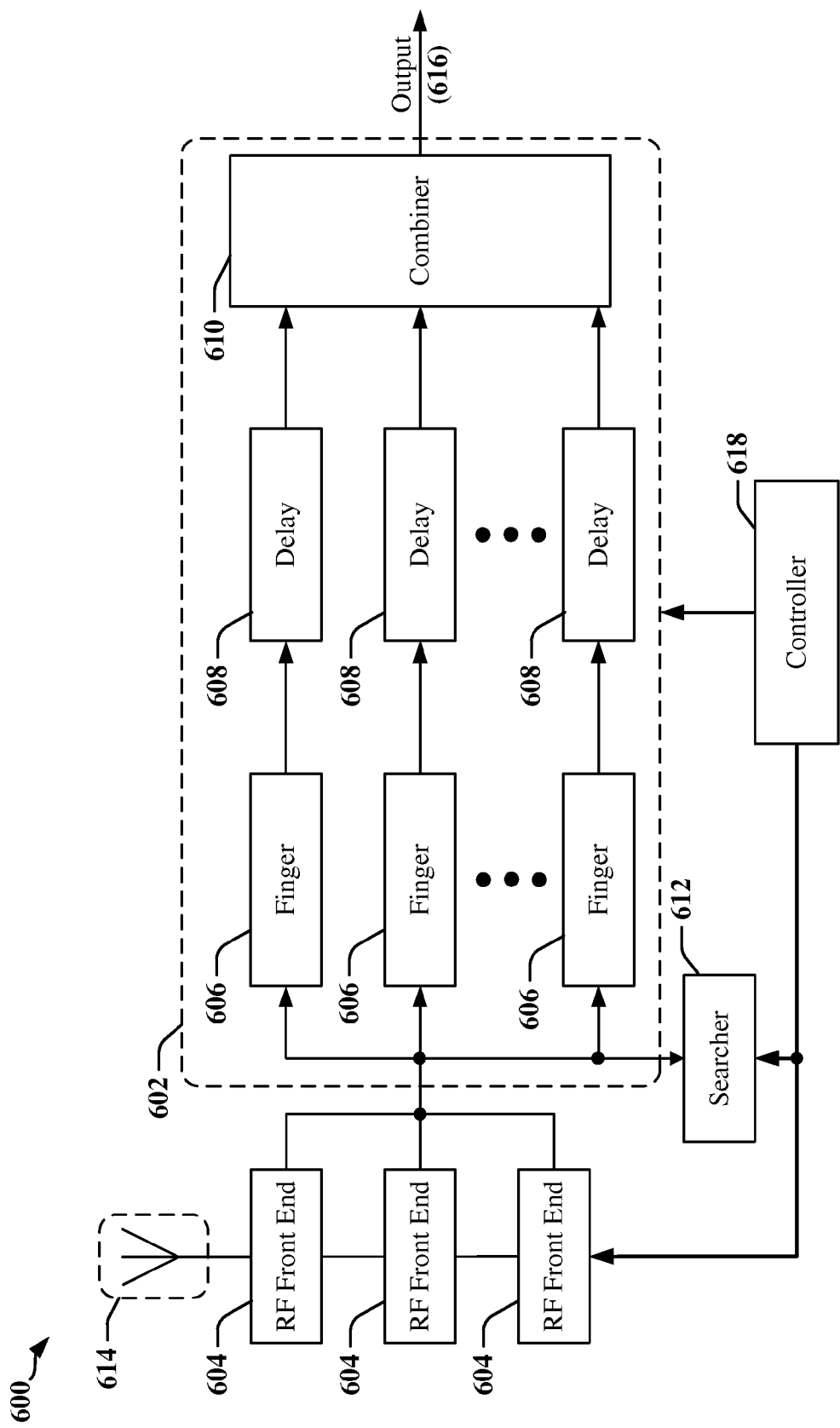
FIG. 6 is a simplified block diagram illustrating a Rake receiver in accordance with certain aspects of the present disclosure.

FIG. 6 is a simplified schematic block diagram 600 that illustrates certain aspects of a rake receiver 602, which may adapted to implement the rake receiver 504 illustrated in FIG. 5. In various aspects of the disclosure, the rake receiver 602 may be provided as, or included in a receiver 335 of the base station 310 of FIG. 3, a receiver 354 of the UE 350 of FIG. 3, and/or a transceiver 912 embodied in or coupled to the processing circuit 902 of FIG. 9. The rake receiver 602 may be adapted or configured to counter the undesirable effects of multipath propagation and allow a wireless communications device to receive signals from a plurality of cells, such as cells in the active set. The rake receiver 602 includes a plurality of fingers 606 (e.g., correlators), where each finger 606 may be assigned to a different path associated with a communication signal received at one or more RF front ends 604. In the illustrated example, three fingers 606 and three RF front ends 604 are depicted. In some instances, multiple fingers 606 may be associated with a single RF front end 604.

Each RF front end 604 may include RF amplifiers and other circuits coupled to an antenna system 614. The RF front ends 604 may include, for example, one or more components for receiving multiple signals and for processing the received signals. In one example, the RF front ends 604 and the antenna system 614 may be configured to take advantage of receive diversity gain. Of course, receive diversity is merely one example, and in other aspects, the antenna system 614 may have one antenna, and one RF front end 604 may be provided for processing received signals. The antenna system 614 receives the RF signals, and passes the RF signals to the RF front ends 604. The received RF signals may be demodulated using a demodulator that filters, down-converts and digitizes the received RF signals to form RX samples at baseband frequencies. The samples may be supplied to a searcher 612 and the fingers 606. The searcher 612 may include circuits and/or modules configured to search for and detect signals that have a signal strength exceeding a threshold suitable for decoding. In one example, the threshold may be set at about −10 dB or higher. The searcher 612 may include or cooperate with a channel estimator 524 (see FIG. 5), which may provide channel estimations and/or time estimations that may also be used by the fingers 606 of the rake receiver 602.

A combiner 610 combines the outputs of the fingers 606 to obtain an output signal 616 that may be provided to a decoder, and/or other circuits and modules. A control module and/or circuit 618 may be employed to configure and monitor operations of various components, including the rake receiver 602, the searcher 612 and/or the RF front ends 604. In one example, the control module and/or circuit 618 may include a microprocessor controlled by software, and may be located on the same integrated circuit or on a separate integrated circuit. In another example, the control module and/or circuit 618 may be implemented using one or more processors 360, 370, 390, 394 of the UE 350 (see FIG. 3) and/or the processing circuit 902 (see FIG. 9). In another example, the control module and/or circuit 618 may be in communication with the processing circuit 902.

The rake receiver 602 can have any suitable number of fingers 606. Each finger 606 independently descrambles and de-spreads an assigned path component of the communication signal. The rake receiver 602 may also include several delays 608, which may be connected to respective fingers 606. The delays 608 may compensate for any difference in the arrival times of the symbols at each finger 606. A rake combiner 610 may be adapted to sum the channel-compensated symbols, thereby providing multipath diversity against fading. The contributions of all fingers 606 may be combined in order to capitalize on the different transmission characteristics of each transmission path.

In certain modem architectures, rake receivers may be shared between receivers configured for different radio access technologies. In one example, rake receivers for 3GPP UMTS Release '99 may share hardware vector processing engines (VPE) used by other technologies (e.g., LTE). In another example, receivers may be shared between modules for communication signal reception for Release '99 calls and HSDPA interference cancellation and demodulation improvements. The price (power-usage, etc.) attributable to the receiver fingers and the number of cells that are assigned rake resources may be constantly negotiated between such modules as these are all soft resources with respect to the vector processing engine. Thus, for example, a tradeoff may be made between the number of rake fingers, the number of rake cells, the iterations in HSDPA interference cancellation, and time required to execute various processes associated with the rake receiver 602, HSDPA interference cancellation and demodulation, etc.

A rake receiver 602 in a UE may be configured or adapted to operate at different power states. For example, the rake receiver 602 may toggle between a plurality of operational supply voltage levels and/or clock rates to balance performance and power consumption based on application and/or operational needs. For each defined power state, the rake receiver 602 may support a predefined or preconfigured maximum number of active fingers and cells. For example, at a first power consumption state the receiver may be able to support three (3) active fingers and cells. If the receiver has already assigned three active fingers to cells, activating an additional finger to assign it to another candidate cell in the active list may result in a transition to a second, higher power consumption state, with corresponding increased supply voltage and/or clock rate. Typically, hardware processing time scales with the number of fingers and cells, whereas firmware processing time scales with the number of cells and transmitter power control (TPC) groups. The TPC turn-around time and the end-to-end timeline may be adjusted to accommodate the total timeline. TPC commands may be transmitted to the UE to control the received uplink Signal-to-Interference Ratio (SIR) at a given SIR. The UE may adjust its transmitter power in response to one or more TPC commands received in the downlink. Voltage and/or clock rate may be increased to support more fingers and cells, which typically results in higher power consumption.

In conventional implementations, such as implementations configured for 3GPP2 CDMA2000 1× communication, a "triage" algorithm may be used to track the paths and assign fingers 606 of the rake receiver 602 to detected signal energy. The triage algorithm may be executed periodically and/or cyclically such that each path and assignment is assessed within each "triage cycle." Fingers 606 may be assigned when a signal is determined to have achieved a lock condition. The lock condition may be determined to exist when the signal possesses a predetermined minimum energy. In one example, the signal energy accumulated in a filter is compared to a threshold energy (the "lock threshold energy") to determine if lock has been achieved. Signals that have achieved lock condition may be assigned to a finger 606 and/or combined in the combiner 610 with results from other fingers 606.

The fingers 606 of a rake receiver 602 may be assigned to signals received from different propagation paths. According to conventional triage algorithms, the threshold signal energy at which a finger 606 is assigned to a path is very low, and furthermore, there is no effective finger de-assignment logic in the typical triage algorithm. Moreover, the assignment of fingers 606 based on instantaneous signal energies can lead to a false or undesirable assignment of fingers 606. Once assigned, the assigned fingers 606 may remain active, even after they have been out of lock for an extended period of time. Accordingly, the conventional triage algorithm can result in all or most fingers of a typical rake receiver 602 being active, even if only one strong finger is present or needed.

Transmitter Power Control

With continued reference FIGS. 2, 3, and 5, the UE 350 may include a TPC command generator to construct power control commands and/or portions thereof to be utilized by UE 350 for adjusting the transmit power level of the UE 350. Construction of the power control commands may be based on respective measurements obtained from radio link measurement modules, which may be provided in the channel estimator 524, for example. In one example, the power control commands constructed by the TPC command generator may include TPC command bits, which can indicate whether an increase of the transmit power of the UE 350 or a decrease in transmit power is desired based on the related channel quality measurement(s). Additionally, in the event that an active Radio Link Set (RLS) for the UE 350 and/or one or more other related RLSs corresponding to a UE 350 in the UTRAN 202 contain more than one radio link, cell sectors associated with a base station 310 that correspond to the RLS can transmit respective TPC bits to the UE 350, which can in turn utilize a TPC combining module to combine the TPC bits into a final TPC command for each RLS. Subsequently, the TPC commands can be utilized by a power control module in order to facilitate the appropriate transmit power adjustments to the UE 350.

In accordance with various aspects described herein, one or more base stations 310 in the UTRAN 202 may generate TPC command bits that can be utilized for uplink power control at the UE 350. Similarly, a UE 350 can generate one or more downlink TPC commands at respective uplink slots for respective base stations 310 or other entities in the UTRAN 202 in the active set of respective UEs 350, which can be processed by respective entities in the UTRAN 202 and utilized to adjust associated downlink transmit power parameter(s) accordingly.

Figure 7:
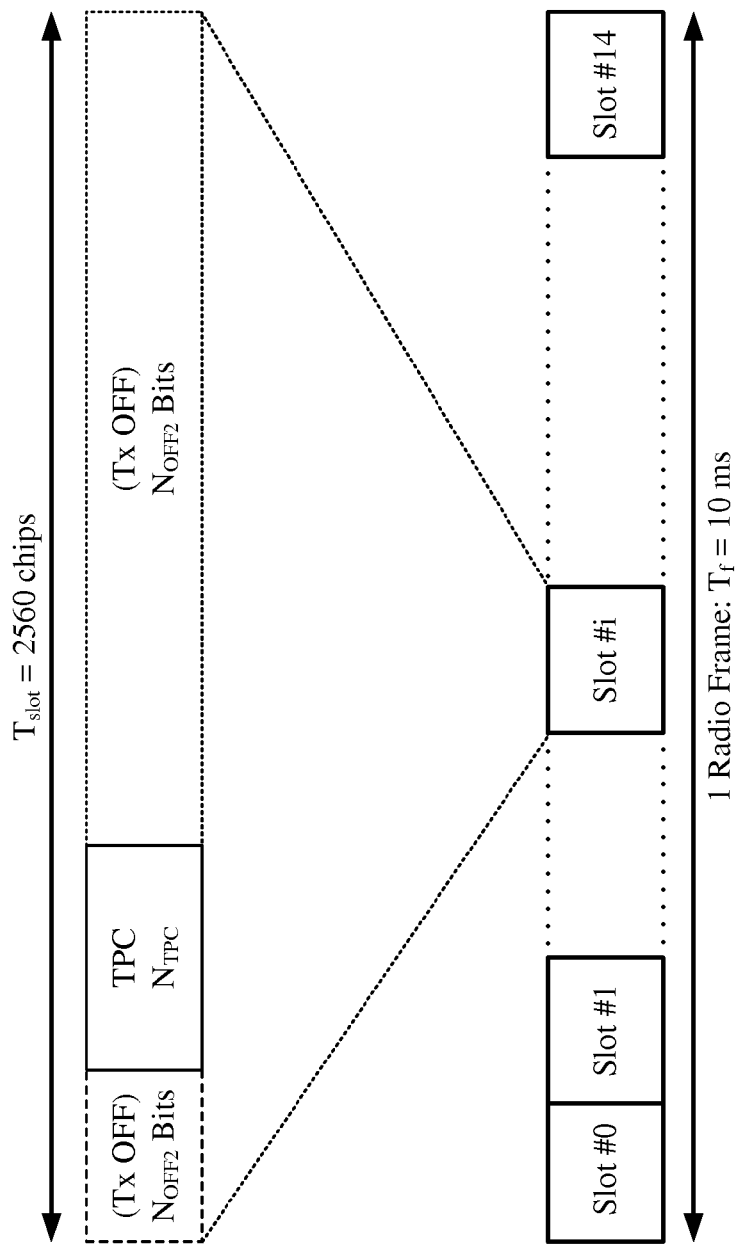
FIG. 7 illustrates one example of a channel format that may be utilized in accordance with or more aspects of the present disclosure.

With reference also to FIG. 7, the base station 310 and/or the UE 350 may utilize any suitable channel format for conveying TPC command information. In one example 700, a Fractional Dedicated Physical Channel (F-DPCH) format may be employed. In this example, the F-DPCH channel format may provide radio frames having a length $T_f$ of 10 ms, or any other suitable length. The radio frames can be divided into one or more slots of uniform or non-uniform length. In the illustrated example, 14 slots are provided with a length $T_{slot}$ of 2560 chips.

Respective slots can be configured to carry TPC bits at one or more portions as defined by offset parameters $N_{OFF1}$ and $N_{OFF2}$. In one example, multiple F-DPCH slot formats can be utilized to vary the positioning of the TPC bits within a slot. For example, 10-slot formats can be utilized, such that for an integral bit position k between 0 and 9, a k-th slot format maps to an offset $N_{OFF1}$ of (2k+2) mod 20 bits. In one example, the slot format to be utilized for a given radio link can be signaled by a Radio Resource Control (RRC) layer and/or another suitable protocol layer. For example, a RRC Information Element can be utilized to signal a slot format for an associated radio link.

The slots in the F-DPCH frames can be configured with a length consistent with a plurality of block processing groups (BPGs). By way of specific example, each of 10 BPGs in a slot can be 256 chips in length such that a slot can be 2560 chips in total length. In another example, multiple bits can be transmitted on a given BPG based in an implemented modulation scheme. Thus, as a specific, non-limiting example, a rotated Binary Phase Shift Keying (BPSK) or Quadrature Phase Shift Keying (QPSK) modulation scheme can be utilized such that a given BPG can be utilized to carry two bits (e.g., an in-phase (I) bit and a quadrature (Q) bit).

In one example, DL F-DPCH frames and UL DPCCH frames can be synchronized in time in a predetermined manner. Thus, for example, an UL slot boundary can be configured to occur 1024 chips after the DL slot boundary of the reference cell corresponding to radio link 1. Additionally or alternatively, respective DL radio links can be frame-aligned within a predefined tolerance of the reference cell (e.g., +/−148 chips). In one example, an associated network can be responsible for aligning the respective radio links and signaling their respective offsets from corresponding CPICHs. For example, a 1-byte parameter can be utilized to signal the offset of a given radio link with 256-chip accuracy where the offset TFDPCH is given by $0 \leq \tau_{FDPCH} \leq 149$ chips.

Triage and Selection of Reference Cells

Figure 8:
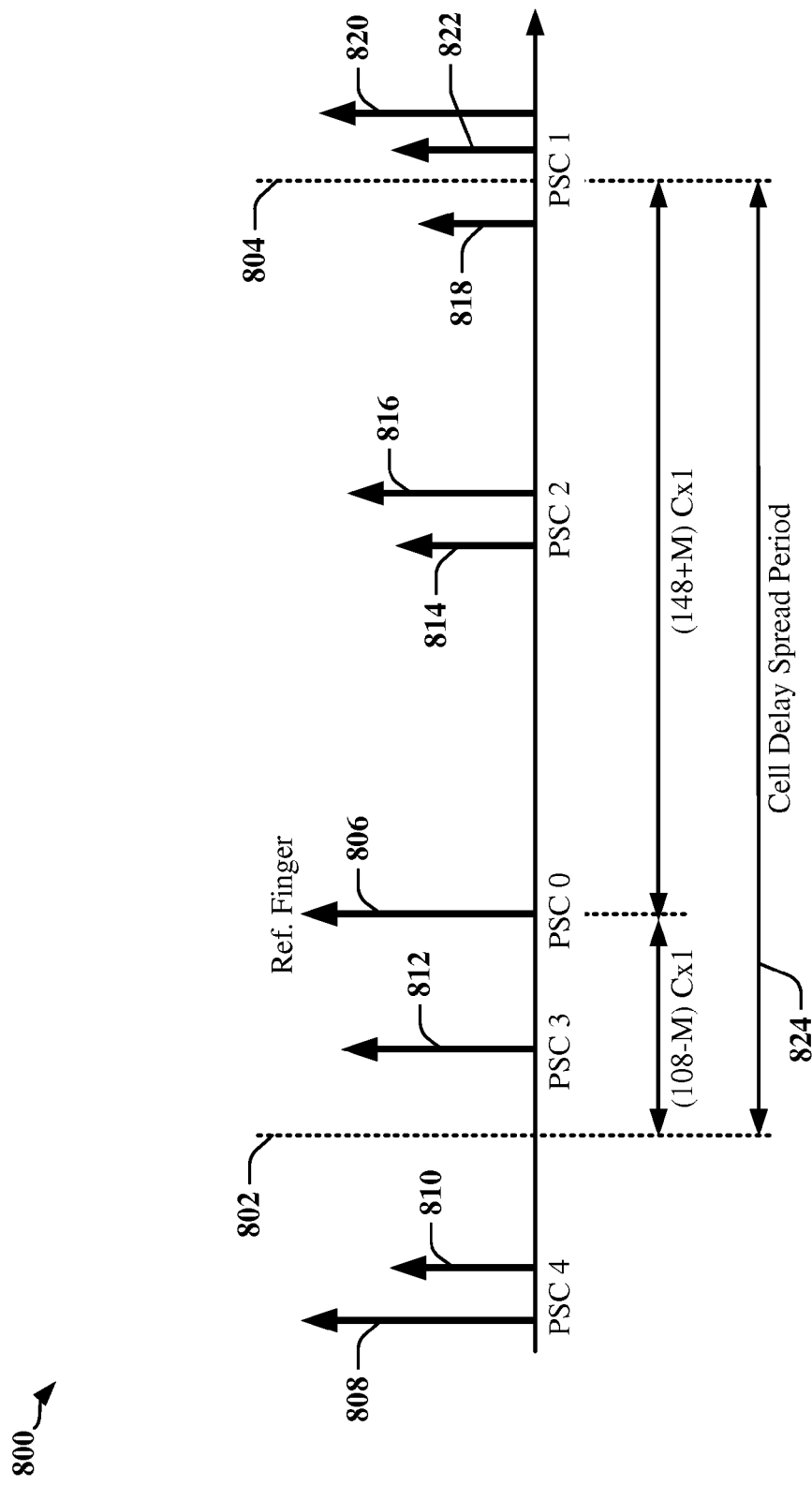
FIG. 8 is a timing diagram illustrating certain aspects of reference cell selection in accordance with or more aspects of the present disclosure.

The timing diagram 800 of FIG. 8 illustrates the different arrival times of signals at a UE 350. Certain radio access technologies define a turnaround time that defines a timeline for system designers. In one example, a 2 BPG TPC turnaround time constraint is defined for certain UMTS systems, where the 3GPP specifications state that "A UE shall support reception, demodulation and combining of signals of a downlink DPCH, or a downlink F-DPCH, when the receive timing is within a window of T0+/−148 chip before the transmit timing . . . " In UMTS systems, the UE 350 may be adapted to combine, for processing, signals 814, 816, 818 received from cells within a window of time defined as 148 chips of the reception of a downlink reference cell signal 806. Within the corresponding window of time, the UE 350 performs and/or completes certain processing in RF, hardware, firmware, and software modules in accordance with system specifications. Furthermore, since each cell may transmit signals over more than one path, the multipath span of each cell (M C×1) is to be considered. The multipath span may be referred to as the cell delay spread. In other words, the 148 C×1 cell spread and also the cell delay spread are to be designed such they can be accommodated into the 2 BPG TPC turnaround time.

In some instances, RF, hardware, firmware, and software processing of uplink transmit power command (ULTPC) may limit the cell delay spread that can be handled by the UE 350. A reduced cell delay spread may result in performance loss up to 3 dB, for example, due to loss of fingers that are out of range, and wasted resources used to track fingers that are out of range. A finger which receives a signal that arrives after the cell delay spread used for decoding may be referred to as an out-of-range finger. Certain aspects described herein provide techniques, approaches, systems and methods that may be employed to improve triage and mitigate the impact of reduced cell delay spread.

According to a first aspect, the impact of reduced cell delay spread on performance may be mitigated using a modified reference cell reselection algorithm provided in accordance with certain aspects disclosed herein. In one example, the modified reference cell reselection algorithm assigns a higher priority to a late-arriving cell signal.

According to a second aspect, an out-of-range finger may be de-assigned faster when its energy is determined to below a predefined threshold. For most scenarios investigated during field testing, observed out-of-range fingers may be attributed to fake paths found by a searcher 612 (see FIG. 6). A finger structure resource may be occupied for a long period of time when it is assigned to a fake path, including when the finger does not detect or receive a good energy level. The searcher 612 may identify some signal paths as candidates for decoding when the signals received from these paths are not suitable for decoding. Such incorrectly identified paths may be referred to as fake paths. While the searcher 612 may be adapted such that it returns a small number of fake paths, a fake path from the searcher 612 that results in a finger being assigned to the fake path may prevent the assignment of fingers to signals of interest to the UE 350. Fingers associated with fake paths are treated as normal fingers, and the finger assigned to the fake path is not de-assigned until it has been out of lock condition for approximately 2.4 seconds. The finger falls out of lock condition when it exhibits an energy level that is lower than a preselected energy threshold for combining Problems with fake path assignment tend to increase when resources are limited on the UE 350 and/or when the density of deployment of the UMTS network increases.

According to a third aspect, triage may be optimized through better utilization of current finger resources. In one example, 12 fingers may be available for a first carrier, 12+6 fingers for DC HSDPA setup, and 10+8 fingers for DC HSUPA setup. In some instances, 12 finger structures may not be sufficient for detected paths/cells. Certain approaches disclosed herein provide for better utilization of existing finger structures.

Selecting a Later Cell as a Reference Cell

According to certain aspects, finger triage may be improved by prioritizing later cells when selecting a reference cell. Uplink timing at the UE 350 tracks the downlink timing associated with the finger assigned to a reference cell signal 806. As illustrated in the timing diagram 800, a reduced cell delay spread may result in an increased potential for out-of-range finger/cells. According to certain aspects, a wireless communications device may be adapted to perform a reference cell selection procedure. In some instances, a reference cell selection procedure defined in existing standards may be used. In other instances, the wireless communications device may be configured to perform an ad hoc reference cell selection procedure by combining features of applicable wireless communications standards. In 3GPP specifications, for example, the reference cell is specified in a RadioBearerSetup or PhysicalChannelReconfig signaling message to the UE 350. The specification does not clearly and/or explicitly mandate a methodology for choosing a new reference cell after a prior reference cell is removed. In some instances, the reference cell selection criteria may be modified such that at least some occurrences of out-of-range fingers can be avoided, and performance loss attributable to those cells with out-of-range fingers can be reduced. In one example, the latest cell 820 (i.e. the cell whose signal arrives latest) may be selected as the reference cell, thereby eliminating the possibility of an out-of-range finger occurring.

According to certain aspects, a UE 350 may be adapted to obtain an improved cell/finger assignment, including when cell delay spread is reduced. A reference cell selection process executed at the UE 350 after a previous reference cell is removed includes identifying the strongest cell signal 820 among the cell signals 814, 816, 818, 820, 822 that occur after the reference cell signal 806 of the previous reference cell. This strongest cell signal 820 is selected as the new reference cell, unless it is weaker by a threshold amount than the strongest signal 808 among cell signals 808, 810, 812 that occur earlier than the previous reference cell signal 806. The threshold amount may be expressed as some number of dBs (X dB).

In the example depicted in the timing diagram 800, the previous reference cell (PSC 0) may be removed from the active set in response to a message such as an AssetUpdate message received at the UE 350 from the network. The strongest cell signal identified among cell signals that occur later than the reference cell signal 806 corresponding to PSC 0 may be a cell signal 820 corresponding to the PSC 1 cell. The strongest cell signal identified among cell signals that occur earlier than PSC 0 may be a cell signal 808 that corresponds to the PSC 4 cell.

The energies of the strongest later cell signal 820 and the strongest earlier cell signal 808 may be compared. When the energy of the strongest later cell signal 820 is not less than X dB lower that the energy of the strongest earlier cell signal 808, PSC 1 may be selected as the new reference cell. In one example, the value of X may be set to 3 (i.e. the threshold amount is 3 dB) and later adjusted based on operational conditions, for example. In some instances, the comparisons of energies may be restricted to comparisons of cells that correspond to locked fingers, where a locked finger has an energy greater than a predetermined lock threshold energy.

Early Identification and Removal of Fake Paths

In some implementations, finger triage may be improved using a run-length in-lock status count to remove fake paths. The use of a run-length in-lock status count may enable out-of-range finger/cell assignments corresponding to fake paths received from the searcher 612 to be released more quickly, and may provide more efficient usage of finger resources. The fake paths may include paths that do not achieve lock, although such paths may be reported by the searcher 612 and processed using the finger structure of the rake receiver. In conventional implementations, significant delays can occur before fingers associated with fake paths can be reassigned.

In some instances, and in accordance with certain aspects disclosed herein, the run-length of in-lock status may be counted for each finger and certain fingers may be removed when those fingers do not achieve lock within a predefined or preconfigured threshold period of time. The threshold period of time may be expressed as a number of seconds (P seconds) after the finger is assigned. In one example, the threshold period of time may be determined from a statistical analysis of out-of lock (OOL) durations measured during field testing.

In one example, a lifetime counter (A) may be maintained for each finger. The lifetime counter may be incremented by 1 when the finger is in lock during a triage cycle. In some instances, triage cycles occur every 14 microseconds. The lifetime counter may be reset (A=0) when the finger is assigned, reassigned, and/or deassigned. A run-length counter (B) may be maintained for each finger. The run-length counter may be reset (B=0) when the finger is assigned, reslammed, and/or deassigned. The run-length counter may be incremented by 1 if the finger is in lock during the current triage cycle. In some implementations, the run-length counter may be decremented by at least 1 if the finger is not in lock during the current triage cycle. In other implementations, the run-length counter may be cleared (A=0) when the finger is not in lock during the current triage cycle.

A finger may be deassigned when it is determined to be associated with a fake path. In one example, the finger is determined to be associated with a fake path when the lifetime counter remains in a reset state (A=0) after the threshold period of time (e.g., P seconds), indicating that the finger has not achieved lock status. In another example, the finger is determined to be associated with a fake path when there is no path found around the finger location with reasonable energy. The measure of reasonable energy may be based on a comparison of the signal energy accumulated in a filter to one or more thresholds, such as the lock threshold energy that is used to determine if lock has been achieved, the finger assignment threshold, the threshold used to determine and out-of-lock condition, and/or the minimum energy threshold for combining. The value of P may be selected based on empirical measurements and/or based on results calculated from models or simulation. In one example, empirical results may suggest a value of P=500 milliseconds (ms), which may correspond to approximately 12 triage cycles. This value of P may be selected to obtain a certain balance, since 10% of the fingers will typically not achieve lock status after 500 ms. Thus, in the example, a finger that does not achieve lock status after 500 ms may be de-assigned. In this manner the duration of time in which a finger is assigned to a fake path may be limited.

In some instances, deassignment cycles for out-of-range fingers can be reduced further. That is to say, the value of P used for out-of-range fingers can be different from the value of P used for normal fingers. A smaller value of P for out-of-range fingers enables faster de-assigning than for normal fingers, and may preserve certain RF, hardware, firmware, and/or software resources.

Replacing Weaker Cells with Stronger Cells

According to certain aspects disclosed herein, fingers assigned to weak paths may be reassigned to strong paths. In one example, competition can be introduced between strong paths without finger assignment and paths assigned to fingers that are weak and/or out-of-lock.

According to certain aspects, a finger associated with a weakest path may be reslammed to a path that does not have a finger assignment and that is stronger by a threshold level of Y dB than the weakest path. Higher priority for de-assignment may be given to out-of-range fingers. In some instances, reslamming is not performed if the weakest path corresponds to a mandatory finger. The UE may be configured to track a plurality of cells, and a finger of the rake receiver may be considered to be a mandatory finger when it is the only finger assigned to a cell that the UE is tracking. For example, the UE may be tracking cells identified in an active list such as the active RLS.

In one example, the UE 350 of FIG. 3 may operate in a RRC connected mode in which it communicates using a dedicated channel (e.g., a CELL_DCH mode), and may have assigned all available fingers (i.e., the finger number is at its limit). There may be one or more paths that have no finger assignment, and which have a path energy, expressed as a ratio of energy to interference in the channel (Ec/Io). An unassigned path may be considered for replacing a weaker assigned path if the difference in energy exceeds the Y dB threshold. Fingers that may be reassigned include fingers that have been out of lock (OOL) for at least N triage cycles. A counter may be configured to count the number of OOL cycles. The non-mandatory finger with the longest OOL cycles may be reassigned the strongest path that does not have a finger assignment In some instances, replacement is performed for all unassigned paths that have an energy difference greater than Y dB over the weakest assigned path. In some instances, mandatory fingers are excluded from a list of potential replacement targets. Higher de-assignment priority may be given to those out-of-range fingers to have the resources cleared for strong paths.

The values of Y and N may be selected based on empirical measurements or based on results calculated from models or simulation. A value for N may be determined based on a percentage of fingers (typically greater than 90%) that have first OOL duration, and marginal increases in the percentage are observed one or more seconds after the first OOL duration. In one example, 94% percent of fingers may have an OOL duration of 1 second and 96% of fingers may have an OOL duration of 2.4 seconds, representing a 2% in number of fingers after more than double the measurement time. In this latter example, a value of N=25 (1 sec) may be selected. In some instances, a value of Y=−23 dB may correspond to a 1% fake assignment rate, and a value of Y=−21 dB may be sufficient to achieve a 0.01% fake assignment rate.

In one example, a conservative value of X=−20 dB may be used to ensure that a path under consideration is a real path. In this example, values of Y=−20 dB, and N=25 triage cycles may be used.

In some instances, two or more levels of path replacement may be employed. For example, two sets of values {Y=−20 dB, N=25 cycles}, and {Y=−15 dB, N=10 cycles} may be defined or configured.

Figure 9:
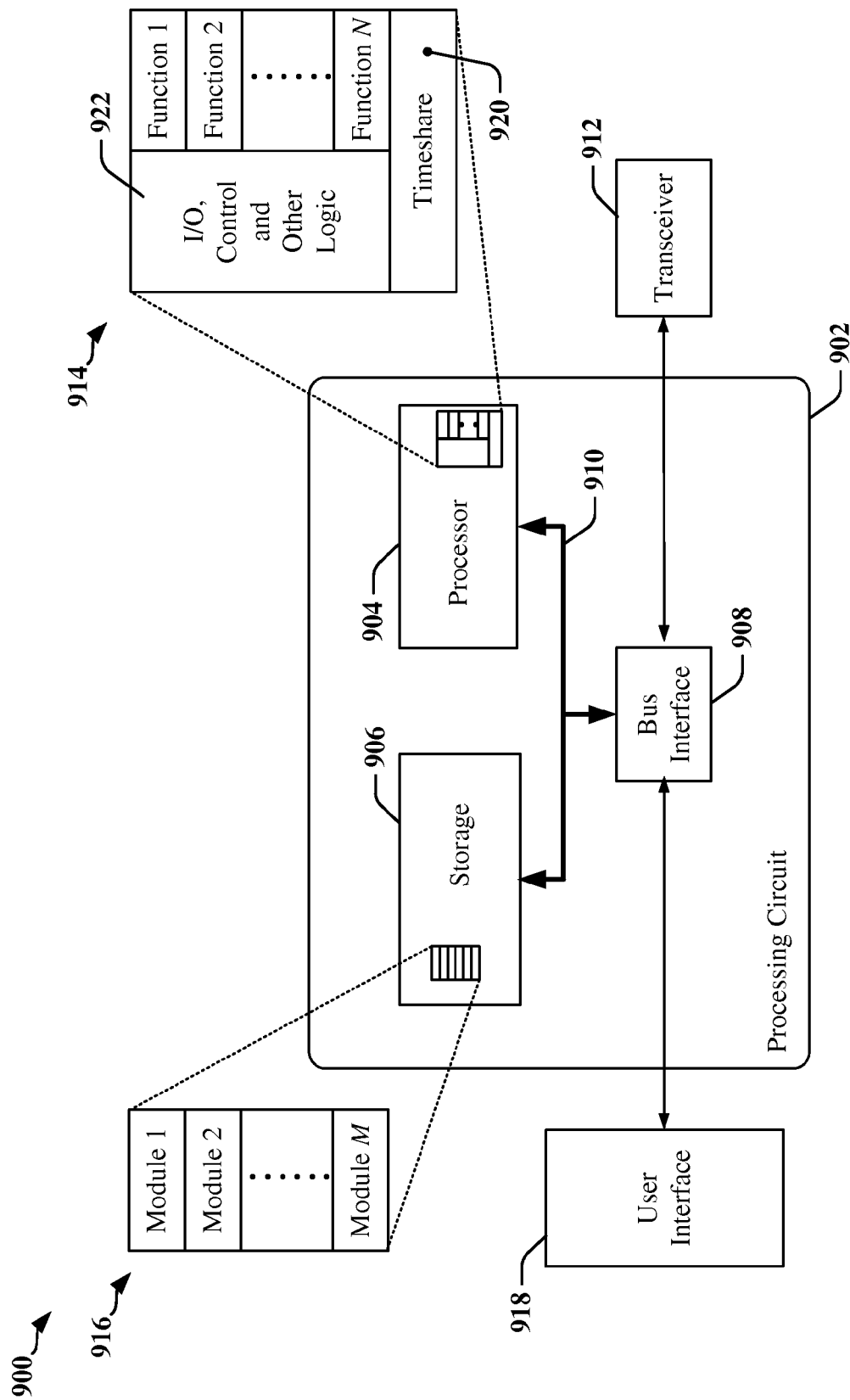
FIG. 9 is a block diagram illustrating an example of an apparatus employing a processing system that may be adapted according to certain aspects disclosed herein.

FIG. 9 is a conceptual diagram 900 illustrating a simplified example of a hardware implementation for an apparatus employing a processing circuit 902 that may be configured to perform one or more functions disclosed herein. In accordance with various aspects of the disclosure, an element, or any portion of an element, or any combination of elements as disclosed herein may be implemented using the processing circuit 902. The processing circuit 902 may include one or more processors 904 that are controlled by some combination of hardware and software modules. Examples of processors 904 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 904 may include specialized processors that perform specific functions, and that may be configured, augmented or controlled by one of the software modules 916. The one or more processors 904 may be configured through a combination of software modules 916 loaded during initialization, and further configured by loading or unloading one or more software modules 916 during operation.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 links together various circuits including the one or more processors 904, and storage 906. Storage 906 may include memory devices and mass storage devices, and may be referred to herein as computer-readable media and/or processor-readable media. The bus 910 may also link various other circuits such as timing sources, timers, peripherals, voltage regulators, and power management circuits. A bus interface 908 may provide an interface between the bus 910 and one or more transceivers 912. A transceiver 912 may be provided for each networking technology supported by the processing circuit. In some instances, multiple networking technologies may share some or all of the circuits or processing modules found in a transceiver 912. Each transceiver 912 provides a means for communicating with various other apparatus over a transmission medium. Depending upon the nature of the apparatus, a user interface 918 (e.g., keypad, display, speaker, microphone, joystick) may also be provided, and may be communicatively coupled to the bus 910 directly or through the bus interface 908.

A processor 904 may be responsible for managing the bus 910 and for general processing that may include the execution of software stored in a computer-readable medium that may include the storage 906. In this respect, the processing circuit 902, including the processor 904, may be used to implement any of the methods, functions and techniques disclosed herein. The storage 906 may be used for storing data that is manipulated by the processor 904 when executing software, and the software may be configured to implement any one of the methods disclosed herein.

One or more processors 904 in the processing circuit 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 906 or in an external computer readable medium. The external computer-readable medium and/or storage 906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 906 may also include, by way of example, a carrier wave, a transmission line, and any other suitable medium for transmitting software and/or instructions that may be accessed and read by a computer. Computer-readable medium and/or the storage 906 may reside in the processing circuit 902, in the processor 904, external to the processing circuit 902, or be distributed across multiple entities including the processing circuit 902. The computer-readable medium and/or storage 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the one or more processors 904, contribute to a run-time image 914 that controls the operation of the one or more processors 904. When executed, certain instructions may cause the processing circuit 902 to perform functions in accordance with certain methods, algorithms and processes described herein.

Some of the software modules 916 may be loaded during initialization of the processing circuit 902, and these software modules 916 may configure the processing circuit 902 to enable performance of the various functions disclosed herein. For example, some software modules 916 may configure internal devices and/or logic circuits 922 of the processor 904, and may manage access to external devices such as the transceiver 912, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to the transceiver 912, the user interface 918, and so on.

One or more processors 904 of the processing circuit 902 may be multifunctional, whereby some of the software modules 916 are loaded and configured to perform different functions or different instances of the same function. The one or more processors 904 may additionally be adapted to manage background tasks initiated in response to inputs from the user interface 918, the transceiver 912, and device drivers, for example. To support the performance of multiple functions, the one or more processors 904 may be configured to provide a multitasking environment, whereby each of a plurality of functions is implemented as a set of tasks serviced by the one or more processors 904 as needed or desired. In one example, the multitasking environment may be implemented using a timesharing program 920 that passes control of a processor 904 between different tasks, whereby each task returns control of the one or more processors 904 to the timesharing program 920 upon completion of any outstanding operations and/or in response to an input such as an interrupt. When a task has control of the one or more processors 904, the processing circuit is effectively specialized for the purposes addressed by the function associated with the controlling task. The timesharing program 920 may include an operating system, a main loop that transfers control on a round-robin basis, a function that allocates control of the one or more processors 904 in accordance with a prioritization of the functions, and/or an interrupt driven main loop that responds to external events by providing control of the one or more processors 904 to a handling function.

Figure 10:
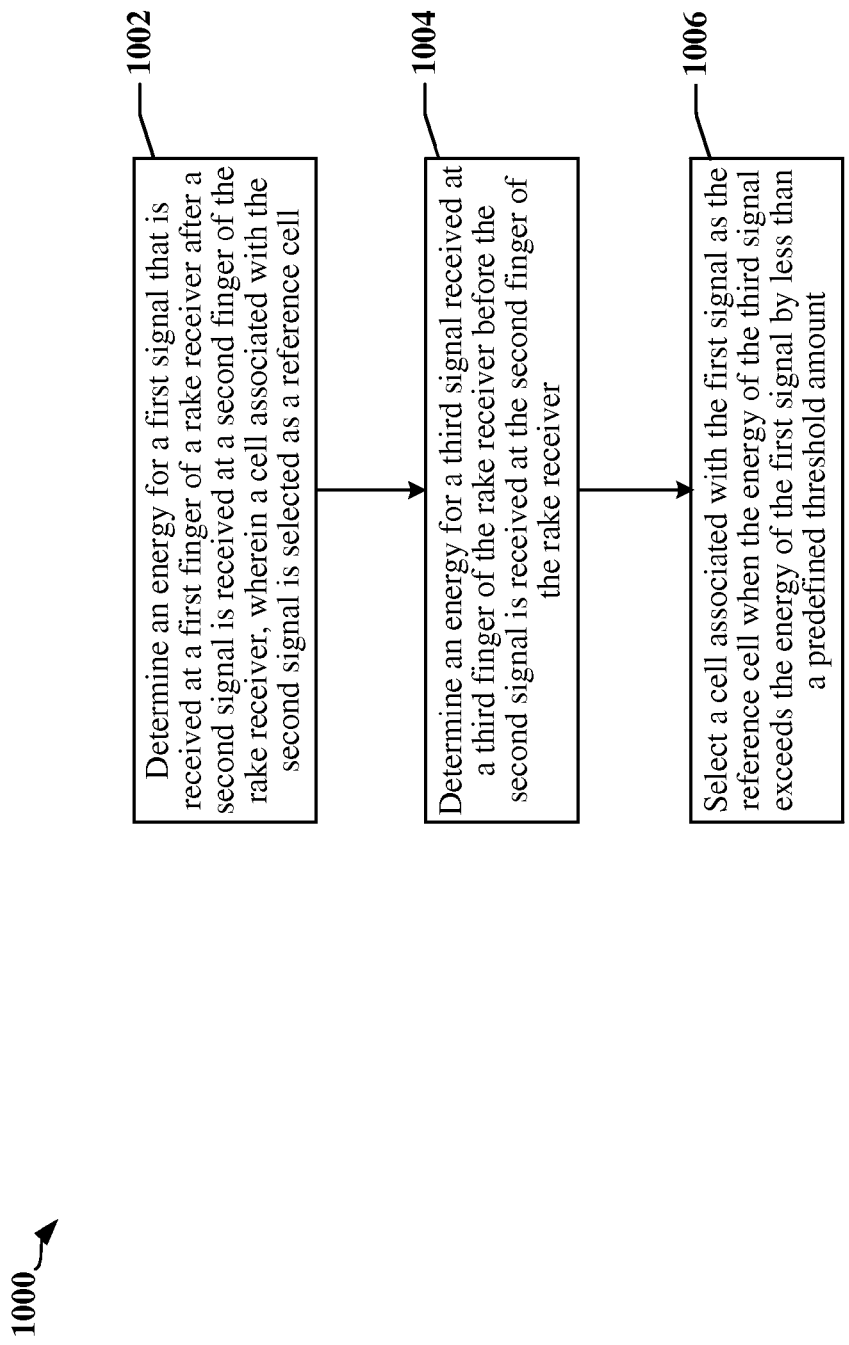
FIG. 10 is a first flow chart showing a method for cell/finger assignment.

FIG. 10 is a flowchart 1000 illustrating a method for data communications executed at a UE. In one example, the UE 350 illustrated in FIG. 3 may be configured to perform the method. For instance, the receiver 335 of the UE 350 may be adapted to include one or more elements of the receiver/decoder module 400 illustrated in FIG. 4, including the interference canceller 404 or the interference canceller 502 illustrated in FIG. 5, the rake receiver 504 or the rake receiver 602 illustrated in FIG. 6. Certain functional elements of the UE 350 may be implemented using a processing module such as the processing circuit 902 illustrated in FIG. 9.

At block 1002, the UE 350 may determine an energy for a first signal 820 that is received at a first finger 606 of a rake receiver 602 after a second signal 806 is received at a second finger 606 of the rake receiver 602. A cell associated with the second signal 806 may have been designated or selected as a reference cell. In one example, the UE 350 may determine energies for a plurality of signals 814, 816, 818, 822, 820 that arrive at the rake receiver after the second signal 806, and select a signal 820 with greatest energy in the plurality of signals as the first signal. In this example, each signal in the plurality of signals 814, 816, 818, 822, 820 may be considered when it has an energy that is greater than a lock threshold energy.

At block 1002, the UE 350 may determine an energy for a third signal 808 received at a third finger 606 of the rake receiver 602 before the second signal is received at the second finger of the rake receiver. For example, the UE 350 may determine the energies of a plurality of signals 808, 810, 812 that arrive at the rake receiver before the second signal 806, and select a signal 808 that has the greatest energy in the plurality of signals 808, 810, 812 as the third signal.

At block 1002, the UE 350 may select a cell associated with the first signal 820 as the reference cell when the energy of the third signal 808 exceeds the energy of the first signal 820 by less than a predefined threshold amount. The cell associated with the first signal 820 may be selected as the reference cell by deselecting the reference cell (i.e., the cell associated with the second signal 806), and executing a reference cell selection procedure.

In one example, the cell associated with the first signal 820 may be selected as the reference cell after determining a first number of signals (e.g. one or more of the signals 806, 812, 814, 816, 818, 822) occurring within a predefined cell delay spread period relative to the first signal 820, determining a second number of signals 812, 814, 816, 818 occurring within the predefined cell delay spread period 824 relative to the second signal 806, and executing a reference cell selection procedure when the first number of signals exceeds the second number of signals.

In another example, the cell associated with the first signal 820 may be selected as the reference cell after determining a third number of signals (e.g. one or more of the signals 806, 812, 814, 816, 818, 822) that have an energy exceeding a lock threshold energy and occur within a predefined cell delay spread period relative to the first signal 820, determining a fourth number of signals 812, 814, 816, 818 that have an energy exceeding the lock threshold energy and occur within the predefined cell delay spread period 824 relative to the second signal 806, and executing a reference cell selection procedure when the third number of signals exceeds the fourth number of signals.

In some instances, the UE 350 may be configured to assign a fourth signal received at the rake receiver 602 to a fourth finger 606 of the rake receiver 602, reset a first counter corresponding to the fourth finger 606 to a reset value (e.g., a zero value) when the fourth signal is assigned to the fourth finger of the rake receiver 602, periodically determine whether the fourth signal has an energy level that exceeds a threshold energy level, increment the first counter in each period where the energy level is determined to exceed the threshold energy level, and de-assign the fourth signal from the fourth finger 606 of the rake receiver when the first counter remains at the reset value after a predetermined number of periods. The threshold energy level may correspond to an energy threshold that determines suitability of the fourth signal for combining with one or more associated signals for decoding. The predetermined number of periods may be selected to limit a duration of time in which a finger is assigned to a fake path.

In some instances, the UE 350 may be configured to reset a second counter corresponding to the fourth finger 606 such that the second counter assumes a reset value. For each of plurality of cycles, the UE 350 determine whether the fourth signal has an energy level that exceeds the threshold energy level, increment the second counter when the energy level exceeds the threshold energy level, and reset or decrement the second counter when the energy level does not exceed the threshold energy level. The fourth signal may be a candidate to be de-assigned from the fourth finger of the rake receiver 602 when the second counter is at the reset value and when the fourth signal is assigned to a non-mandatory finger 606 of the rake receiver. For example, the fourth signal may be reassigned when at least one other finger 606 is assigned a signal from a cell associated with the fourth signal.

For example, the fourth signal may be considered for de-assignment when another signal is detected by the Searcher 612. That is, the UE 350 may be configured to determine that a fifth signal arriving at the rake receiver has an energy level greater than the threshold energy level when each finger of the rake receiver is assigned to another signal. The UE 350 may be configured to reassign the fourth finger 606 from the fourth signal to the fifth signal when the second counter has been at the reset value for a predetermined number of triage cycles.

Figure 11:
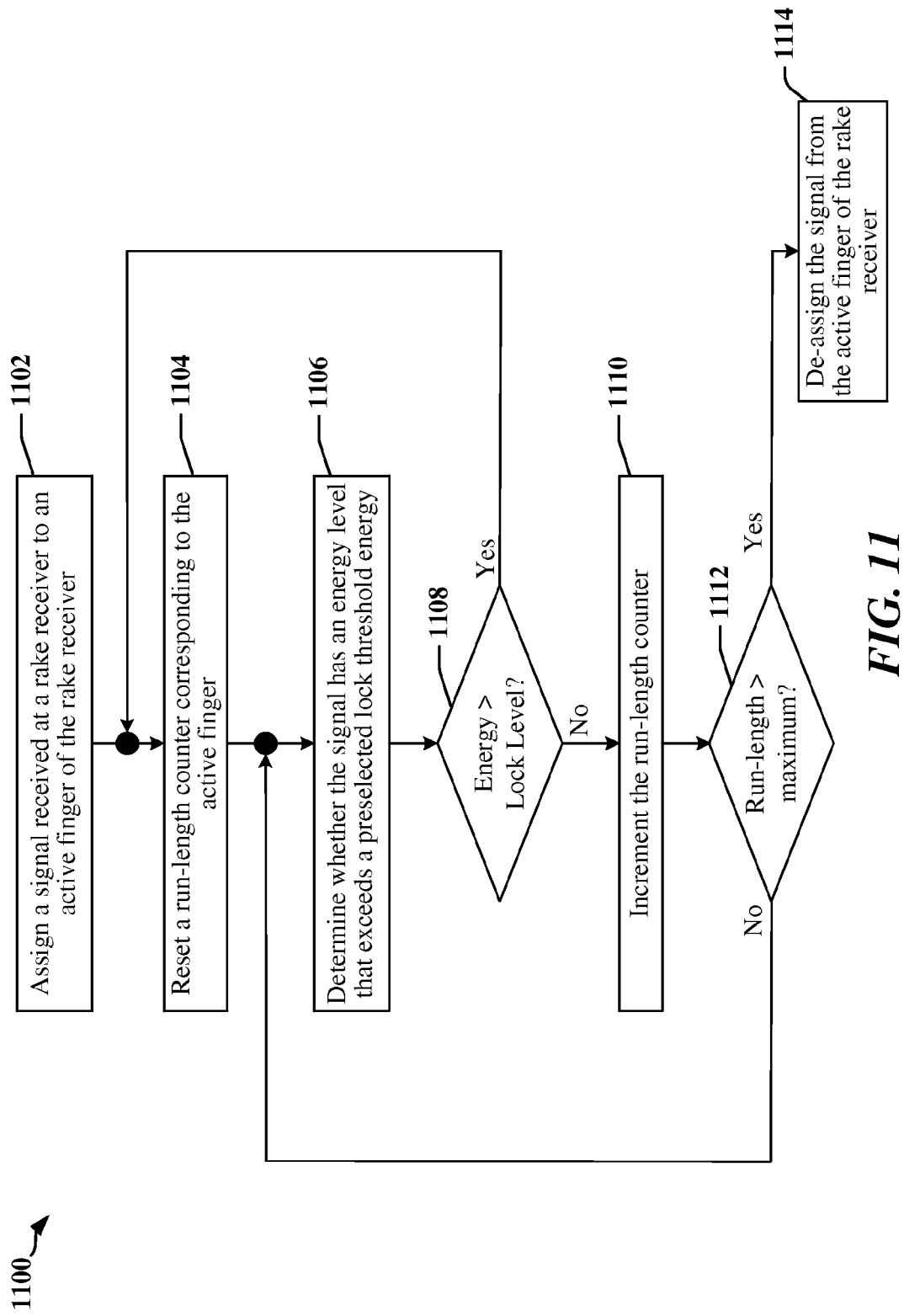
FIG. 11 is a second flow chart showing a method for cell/finger assignment

FIG. 11 is a flowchart 1100 illustrating another example of a method that may be executed by the UE 350. The method may include, expand or supplement certain operations, functions and/or processes described in relation to FIG. 10. The UE 350 illustrated in FIG. 3 may be configured to perform the method. For instance, the receiver 335 of the UE 350 may be adapted to include one or more elements of the receiver/decoder module 400 illustrated in FIG. 4, including the interference canceller 404 or the interference canceller 502 illustrated in FIG. 5, the rake receiver 504 or the rake receiver 602 illustrated in FIG. 6. Certain functional elements of the UE 350 may be implemented using a processing module such as the processing circuit 902 illustrated in FIG. 9.

At block 1102, the UE 350 may assign a signal received at a rake receiver 602 to a finger 606 of the rake receiver 602.

At block 1104, the UE 350 may reset a run-length counter corresponding to the finger.

At block 1106, the UE 350 may determine whether the signal has an energy level that exceeds a lock threshold energy. For example, the lock threshold energy may be used to determine when the energy collected by the finger 606 is of a sufficient power level to enable the signal to be combined with other signals for decoding purposes At decision point 1108, the UE 350 may select a next operation based on the determination of whether the signal has an energy level that exceeds the lock threshold energy. If the energy level exceeds the lock threshold energy, the process returns to lock threshold energy. Otherwise the process continues at block 1110.

At block 1110, the UE may increment the run-length counter when the energy level does not exceed the lock threshold energy.

At decision point 1112, the UE may select a return to block 1106 if the run-length counter does not exceed a predefined maximum run-length.

At block 1114, the UE may de-assign the signal from the finger 606 of the rake receiver 602 when the run-length counter exceeds a predefined maximum run-length.

In one example, a lifetime run-length counter corresponding to the finger 606 may be reset when the signal is assigned to the finger 606 of the rake receiver 602. The lifetime run-length counter may be incremented during each of the plurality of cycles in which the energy level does not exceed the lock threshold energy. The signal may be de-assigned from the finger 606 of the rake receiver 602 when the lifetime run-length counter exceeds a predefined maximum lifetime run-length.

Figure 12:
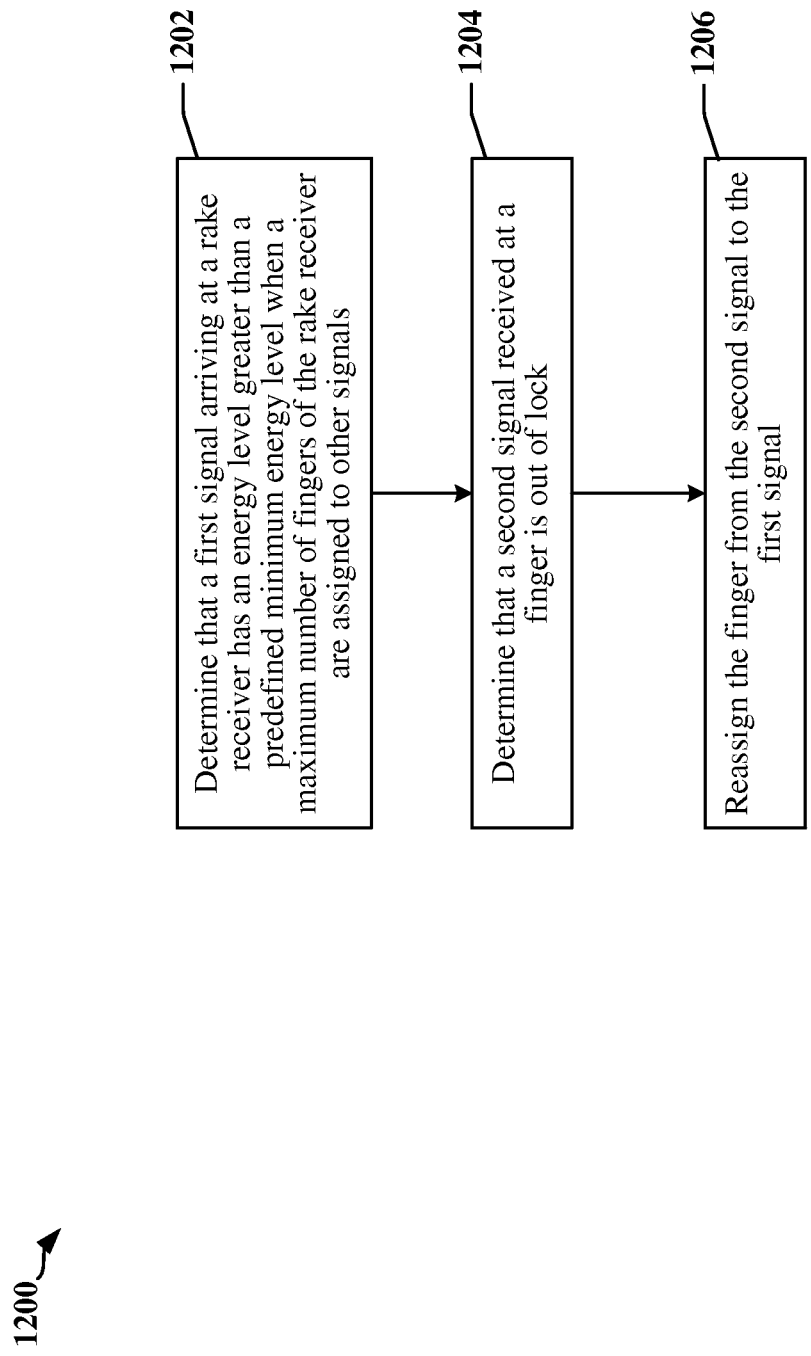
FIG. 12 is a third flow chart showing a method for cell/finger assignment.

FIG. 12 is a flowchart 1200 illustrating another example of a method that may be executed by the UE 350. The method may include, expand or supplement certain operations, functions and/or processes described in relation to FIG. 10. The UE 350 illustrated in FIG. 3 may be configured to perform the method. For instance, the receiver 335 of the UE 350 may be adapted to include one or more elements of the receiver/decoder module 400 illustrated in FIG. 4, including the interference canceller 404 or the interference canceller 502 illustrated in FIG. 5, the rake receiver 504 or the rake receiver 602 illustrated in FIG. 6. Certain functional elements of the UE 350 may be implemented using a processing module such as the processing circuit 902 illustrated in FIG. 9.

At block 1202, the UE 350 may determine that a first signal arriving at a rake receiver 606 has an energy level greater than a predefined minimum energy level when a maximum number of fingers 606 of the rake receiver 602 are assigned to other signals.

At block 1204, the UE 350 may determine that a second signal received at a finger 606 is out of lock. For example, the finger 606 may be out of lock when the energy collected by the finger 606 is below a threshold level that determines which signals are to be combined for decoding purposes.

At block 1206, the UE 350 may reassign the finger 606 from the second signal to the first signal. Typically, the second signal can be assigned to non-mandatory fingers 606 of the rake receiver 602. In one example, a signal may be considered mandatory when it is the only finger 606 assigned to a cell identified in an active list maintained at the UE 350.

In one example, the second signal may be determined to be out-of lock by determining that the second signal has an energy level less than a predetermined lock threshold energy for a predefined number of triage cycles.

Figure 13:
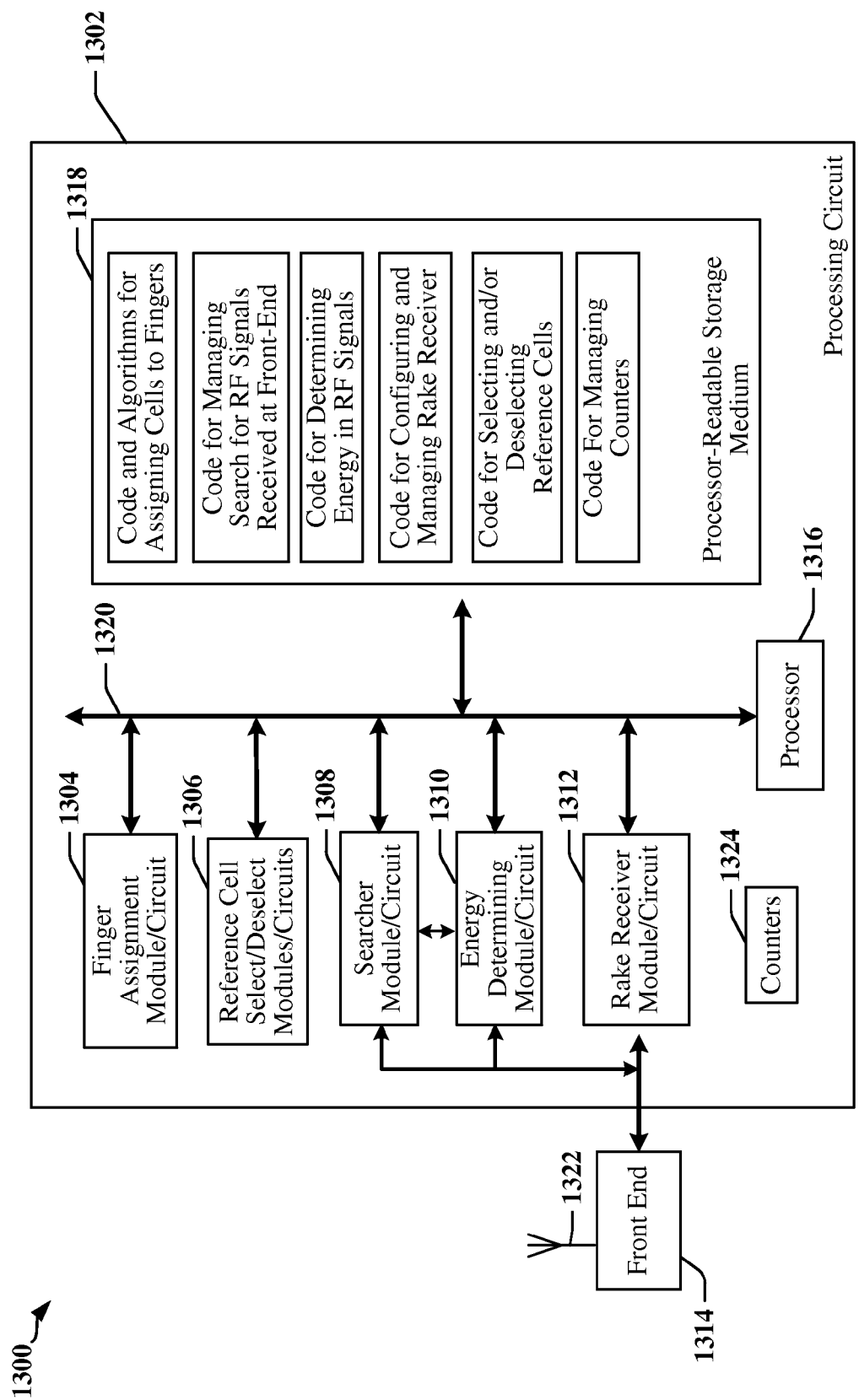
FIG. 13 is a diagram illustrating an example of a hardware implementation for an apparatus employing a processing circuit adapted according to certain aspects disclosed herein

FIG. 13 is a diagram illustrating a simplified example of a hardware implementation for an apparatus 1300 employing a processing circuit 1302. The processing circuit typically has a processor 1316 that may include one or more of a microprocessor, microcontroller, digital signal processor, a sequencer and a state machine. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the processor 1316, the modules or circuits 1304, 1306, 1308, 1310 and 1312, one or more RF front ends 1314 and at least one antenna or antenna system 1322, and the computer-readable storage medium 1318. The bus 1320 may also link various other circuits such as timing sources, peripherals, voltage regulators, and power management circuits, which are well known in the art, and therefore, will not be described any further.

The processor 1316 is responsible for general processing, including the execution of software stored on the computer-readable storage medium 1318. The software, when executed by the processor 1316, causes the processing circuit 1302 to perform the various functions described supra for any particular apparatus. The computer-readable storage medium 1318 may also be used for storing data that is manipulated by the processor 1316 when executing software. The processing circuit 1302 further includes at least one of the modules 1304, 1306, 1308, 1310, and 1312. Certain of the modules 1304, 1306, 1308, 1310 and 1312 may include software modules running in the processor 1316, resident/stored in the computer-readable storage medium 1318, one or more hardware modules coupled to the processor 1316, or some combination thereof. The modules 1304, 1306, 1308, 1310, and/or 1312 may include microcontroller instructions, state machine configuration parameters, or some combination thereof.

The apparatus 1300 may be adapted to implement one or more functional elements of the UE 350 illustrated in FIG. 3, including certain of the functions of the receiver 335. The apparatus 1300 may include modules or circuits that can be adapted to handle the functions of the interference canceller 404 or the interference canceller 502 illustrated in FIG. 5, the rake receiver 504, or the rake receiver 602 illustrated in FIG. 6.

In one configuration, the apparatus 1300 for wireless communication includes a module and/or circuit 1304 that is configured to assign signals to fingers of the rake receiver 1312, a searcher module and/or circuit 1308 configured to search signals received by the RF front ends 1314 for candidates for decoding, A reference cell select/deselect module and/or circuit 1306 configured to drop a current reference cell and select a new cell as the reference cell, an energy determining module and/or circuit 1310 configured to determine or estimate energies of signals received at the RF front end 1314, and a rake receiver. The apparatus 1300 may also include counters and timers used to implement triage algorithms adapted according to certain aspects disclosed herein.

In one example, the various modules and/or circuits of the apparatus 1300 may be adapted such that the energy determining module and/or circuit 1310 is configured to determine energy of signals received at one or more radio frequency front ends 1314, where an energy is determined of a first signal that is received at a first finger of a rake receiver after a second signal is received at a second finger of the rake receiver. A cell associated with the second signal may be selected as a reference cell. The reference cell select/deselect module and/or circuit 1306 may be configured to select a cell associated with the first signal as the reference cell when the energy of a third signal exceeds the energy of the first signal by less than a predefined threshold amount and when the third signal is received at a third finger of the rake receiver before the second signal is received at the second finger of the rake receiver.

In another example, the various modules and/or circuits of the apparatus 1300 may be configured to provide one or more RF front ends 1314 configured to receive a plurality of signals, a searcher module and/or circuit 1308 configured to determine an energy level for each of the plurality of signals, and a rake receiver 1312 having a plurality of fingers (see, e.g., the rake receiver 602 of FIG. 6). The processor 1316 may be configured to select a later arriving signal as a new reference signal when an earlier arriving signal has a greater energy level than the later arriving signal provided that the earlier arriving signal has an energy level that exceeds an energy level of the later arriving signal by less than a predefined threshold amount. The plurality of signals may include multiple versions of a signal of interest.

In another example, the various modules and/or circuits of the apparatus 1300 may be configured to provide one or more RF front ends 1314 configured to receive a plurality of signals, a searcher module and/or circuit 1308 configured to determine an energy level for each of the plurality of signals, a rake receiver 1312 having a plurality of fingers (see, e.g., the rake receiver 602 of FIG. 6), and a first counter 1324 associated with a first finger. The plurality of signals may include multiple versions of a signal of interest. The processor 1316 may be configured to assign a first signal to the first finger of the rake receiver, reset the first counter to a reset value when the first signal is assigned to a first finger of the rake receiver, periodically determine whether the first signal has an energy level that exceeds a threshold energy level, increment the first counter in each period where the energy level is determined to exceed the threshold energy level, and de-assign the first signal from the first finger of the rake receiver when the first counter remains at the reset value after a predetermined number of periods.

Several aspects of a telecommunications system have been presented with reference to an IS-2000 1× system. As those skilled in the art will readily appreciate, various aspects described throughout this disclosure may be extended to other telecommunication systems, network architectures and communication standards.

By way of example, various aspects may be extended to UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
    determining an energy for a first signal that is received at a first finger of a rake receiver after a second signal is received at a second finger of the rake receiver, wherein a cell associated with the second signal is selected as a reference cell;
    determining an energy for a third signal received at a third finger of the rake receiver before the second signal is received at the second finger of the rake receiver; and
    selecting a cell associated with the first signal as the reference cell when the energy of the third signal exceeds the energy of the first signal by less than a predefined threshold amount.

2. The method of claim 1, wherein selecting the cell associated with the first signal as the reference cell comprises:
    deselecting the reference cell; and
    executing a reference cell selection procedure.

3. The method of claim 1, selecting the cell associated with the first signal as the reference cell comprises:
    determining a first number of signals occurring within a predefined cell delay spread period relative to the first signal;
    determining a second number of signals occurring within the predefined cell delay spread period relative to the second signal; and
    executing a reference cell selection procedure when the first number of signals exceeds the second number of signals.

4. The method of claim 1, selecting the cell associated with the first signal as the reference cell comprises:
    determining a third number of signals that exceed a lock threshold energy and occur within a predefined cell delay spread period relative to the first signal;
    determining a fourth number of signals that exceed the lock threshold energy and occur within the predefined cell delay spread period relative to the second signal; and
    executing a reference cell selection procedure when the third number of signals exceeds the fourth number of signals.

5. The method of claim 1, wherein determining the energy for the first signal comprises:
    determining energies for a plurality of signals that arrive at the rake receiver after the second signal; and
    selecting a signal with greatest energy in the plurality of signals as the first signal.

6. The method of claim 5, wherein each signal in the plurality of signals has an energy that is greater than a lock threshold energy.

7. The method of claim 1, wherein determining the energy for the third signal comprises:
    determining energies for a plurality of signals that arrive at the rake receiver before the second signal; and
    selecting a signal with greatest energy in the plurality of signals as the third signal.

8. The method of claim 1, further comprising:
    assigning a fourth signal received at the rake receiver to a fourth finger of the rake receiver;
    resetting a first counter corresponding to the fourth finger to a reset value when the fourth signal is assigned to the fourth finger of the rake receiver;
    periodically determining whether the fourth signal has an energy level that exceeds a threshold energy level;
    incrementing the first counter in each period where the energy level is determined to exceed the threshold energy level; and
    de-assigning the fourth signal from the fourth finger of the rake receiver when the first counter remains at the reset value after a predetermined number of periods.

9. The method of claim 8, wherein the threshold energy level corresponds to an energy threshold that determines suitability of the fourth signal to be combined with one or more associated signals for decoding.

10. The method of claim 8, wherein the predetermined number of periods is selected to limit a duration of time in which a finger is assigned to a fake path.

11. The method of claim 8, further comprising:
    resetting a second counter corresponding to the fourth finger to a reset value; and
    for each of plurality of cycles:
        determining whether the fourth signal has an energy level that exceeds the threshold energy level;
        incrementing the second counter when the energy level exceeds the threshold energy level; and
        resetting or decrementing the second counter when the energy level does not exceed the threshold energy level,
    wherein the fourth signal is a candidate to be de-assigned from the fourth finger of the rake receiver when the second counter is at the reset value and when at least one other finger is assigned a signal from a cell associated with the fourth signal.

12. The method of claim 11, further comprising:
    determining that a fifth signal arriving at the rake receiver has an energy level greater than the threshold energy level when each finger of the rake receiver is assigned to another signal; and
    reassigning the fourth finger from the fourth signal to the fifth signal when the second counter has been at the reset value for a predetermined number of triage cycles.

13. An apparatus for wireless communication, comprising:
    one or more radio frequency front ends configured to receive a plurality of signals, the plurality of signals including multiple versions of a signal of interest;
    a searcher configured to determine an energy level for each of the plurality of signals;
    a rake receiver having a plurality of fingers; and
    a processor configured to:
        determine an energy for a first signal that is received at a first finger of the rake receiver after a second signal is received at a second finger of the rake receiver, wherein a cell associated with the second signal is selected as a reference cell;
        determine an energy for a third signal received at a third finger of the rake receiver before the second signal is received at the second finger of the rake receiver; and
        select a cell associated with the first signal as the reference cell when the energy of the third signal exceeds the energy of the first signal by less than a predefined threshold amount.

14. The apparatus of claim 13, wherein the processor is configured to:
    determine a first number of signals that exceed a lock threshold energy and occur within a predefined cell delay spread period relative to the first signal;

determine a second number of signals that exceed the lock threshold energy and occur within the predefined cell delay spread period relative to the second signal; and execute a reference cell selection procedure when the first number of signals exceeds the second number of signals.

15. The apparatus of claim 13, further comprising:
a decoder configured to decode information from signals arriving within a predefined cell delay spread period and assigned to the plurality of fingers.

16. The apparatus of claim 13, wherein the processor is configured to:
determine energies for one or more signals that arrive at the rake receiver before the second signal; and
select a signal with greatest energy in the plurality of signals as the third signal.

17. The apparatus of claim 13, wherein the processor is configured to:
assign a fourth signal received at the rake receiver to a fourth finger of the rake receiver;
reset a first counter corresponding to the fourth finger to a reset value when the fourth signal is assigned to the fourth finger of the rake receiver;
periodically determine whether the fourth signal has an energy level that exceeds a threshold energy level;
increment the first counter in each period where the energy level is determined to exceed the threshold energy level; and
de-assign the fourth signal from the fourth finger of the rake receiver when the first counter remains at the reset value after a predetermined number of periods,
wherein the predetermined number of periods is selected to limit a duration of time in which a finger is assigned to a fake path, and
wherein the threshold energy level corresponds to an energy threshold that determines suitability of the fourth signal for combining with one or more associated signals for decoding.

18. The apparatus of claim 17, wherein the processor is configured to:
reset a second counter corresponding to the fourth finger to a reset value; and
for each of plurality of cycles:
determine whether the fourth signal has an energy level that exceeds the threshold energy level;
increment the second counter when the energy level exceeds the threshold energy level; and
reset or decrementing the second counter when the energy level does not exceed the threshold energy level,
wherein the fourth signal is a candidate to be de-assigned from the fourth finger of the rake receiver when the second counter is at the reset value and when at least one other finger is assigned a signal from a cell associated with the fourth signal.

19. The apparatus of claim 18, wherein the processor is configured to:
determine that a fifth signal arriving at the rake receiver has an energy level greater than the threshold energy level when each finger of the rake receiver is assigned to another signal; and
reassign the fourth finger from the fourth signal to the fifth signal when the second counter has been at the reset value for a predetermined number of triage cycles.

20. An apparatus for wireless communication, comprising:
means for determining energy of signals received at one or more radio frequency front ends, the means for determining energy of signals being configured to determine an energy of a first signal that is received at a first finger of a rake receiver after a second signal is received at a second finger of the rake receiver, wherein a cell associated with the second signal is selected as a reference cell; and means for selecting and deselecting a reference cell, the means for selecting and deselecting the reference cell being configured to select a cell associated with the first signal as the reference cell when the energy of a third signal exceeds the energy of the first signal by less than a predefined threshold amount and when the third signal is received at a third finger of the rake receiver before the second signal is received at the second finger of the rake receiver.

21. The apparatus of claim 20, wherein the means for selecting and deselecting the reference cell is configured to:
deselect the reference cell; and
initiate a reference cell selection procedure after the reference cell has been deselected.

22. The apparatus of claim 20, further comprising:
means for decoding information from signals arriving within a predefined cell delay spread period and assigned to fingers of the rake receiver.

23. The apparatus of claim 20, wherein the means for determining energy of signals is configured to:
determine a signal with greatest energy in one or more signals that arrive at the rake receiver before the second signal, wherein the signal with the greatest energy is selected as the third signal.

24. The apparatus of claim 20, further comprising controlling means configured to:
assign a fourth signal received at the rake receiver to a fourth finger of the rake receiver;
reset a first counter corresponding to the fourth finger to a reset value when the fourth signal is assigned to the fourth finger of the rake receiver;
periodically determine whether the fourth signal has an energy level that exceeds a threshold energy level;
increment the first counter in each period where the energy level is determined to exceed the threshold energy level; and
de-assign the fourth signal from the fourth finger of the rake receiver when the first counter remains at the reset value after a predetermined number of periods,
wherein the predetermined number of periods is selected to limit a duration of time in which a finger is assigned to a fake path, and
wherein the threshold energy level corresponds to an energy threshold that determines suitability of the fourth signal for combining with one or more associated signals for decoding.

25. The apparatus of claim 24, wherein the controlling means is configured to:
reset a second counter corresponding to the fourth finger to a reset value; and
for each of plurality of cycles:
determine whether the fourth signal has an energy level that exceeds the threshold energy level;
increment the second counter when the energy level exceeds the threshold energy level; and
reset or decrementing the second counter when the energy level does not exceed the threshold energy level,
wherein the fourth signal is a candidate to be de-assigned from the fourth finger of the rake receiver when the second counter is at the reset value and when at least one other finger is assigned a signal from a cell associated with the fourth signal.

26. The apparatus of claim 25, wherein the controlling means is configured to:
   determine that a fifth signal arriving at the rake receiver has an energy level greater than the threshold energy level when each finger of the rake receiver is assigned to another signal; and
   reassign the fourth finger from the fourth signal to the fifth signal when the second counter has been at the reset value for a predetermined number of triage cycles.

27. A non-transitory computer-readable storage medium, having instructions encoded thereon that, when executed by one or more processors in a processing circuit, cause the one or more processors to:
   determine an energy of a first signal that is received at a first finger of a rake receiver after a second signal is received at a second finger of the rake receiver, wherein a cell associated with the second signal is selected as a reference cell; and
   select a cell associated with the first signal as the reference cell when the energy of a third signal exceeds the energy of the first signal by less than a predefined threshold amount, and when the third signal is received at a third finger of the rake receiver before the second signal is received at the second finger of the rake receiver.

28. The non-transitory computer-readable storage medium of claim 27, wherein the instructions cause the one or more processors to:
   determine a signal with greatest energy in one or more signals that arrive at the rake receiver before the second signal, wherein the signal with the greatest energy is selected as the third signal.

29. The non-transitory computer-readable storage medium of claim 27, wherein the instructions cause the one or more processors to:
   assign a fourth signal received at the rake receiver to a fourth finger of the rake receiver;
   reset a first counter corresponding to the fourth finger to a reset value when the fourth signal is assigned to the fourth finger of the rake receiver;
   periodically determine whether the fourth signal has an energy level that exceeds a threshold energy level;
   increment the first counter in each period where the energy level is determined to exceed the threshold energy level; and
   de-assign the fourth signal from the fourth finger of the rake receiver when the first counter remains at the reset value after a predetermined number of periods,
   wherein the predetermined number of periods is selected to limit a duration of time in which a finger is assigned to a fake path, and
   wherein the threshold energy level corresponds to an energy threshold that determines suitability of the fourth signal for combining with one or more associated signals for decoding.

30. The non-transitory computer-readable storage medium of claim 29, wherein the instructions cause the one or more processors to:
   reset a second counter corresponding to the fourth finger to a reset value; and
   for each of plurality of cycles:
      determine whether the fourth signal has an energy level that exceeds the threshold energy level;
      increment the second counter when the energy level exceeds the threshold energy level; and
      reset or decrementing the second counter when the energy level does not exceed the threshold energy level,
   wherein the fourth signal is a candidate to be de-assigned from the fourth finger of the rake receiver when the second counter is at the reset value and when at least one other finger is assigned a signal from a cell associated with the fourth signal.

* * * * *